US007975293B2

(12) United States Patent
Yoshida et al.

(10) Patent No.: US 7,975,293 B2
(45) Date of Patent: Jul. 5, 2011

(54) AUTHENTICATION SYSTEM, AUTHENTICATION METHOD AND TERMINAL DEVICE

(75) Inventors: Hiroki Yoshida, Takatsuki (JP); Satoshi Deishi, Ibaraki (JP); Masahiro Kitamura, Osaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 524 days.

(21) Appl. No.: 12/118,944

(22) Filed: May 12, 2008

(65) Prior Publication Data
US 2009/0271630 A1    Oct. 29, 2009

(30) Foreign Application Priority Data
May 16, 2007  (JP) ................................ 2007-130334

(51) Int. Cl.
*H04L 9/32* (2006.01)
*H04L 29/06* (2006.01)
*G06F 21/20* (2006.01)
*G06F 15/16* (2006.01)
(52) U.S. Cl. ............... 726/10; 713/176; 713/182; 726/4
(58) Field of Classification Search .................. None
See application file for complete search history.

(56) References Cited

U.S. PATENT DOCUMENTS

| | | | | |
|---|---|---|---|---|
| 5,706,427 A | * | 1/1998 | Tabuki | 726/5 |
| 5,841,970 A | * | 11/1998 | Tabuki | 726/2 |
| 5,944,824 A | * | 8/1999 | He | 726/6 |
| 5,987,232 A | * | 11/1999 | Tabuki | 726/5 |
| 6,311,275 B1 | * | 10/2001 | Jin et al. | 726/12 |
| 6,643,782 B1 | * | 11/2003 | Jin et al. | 726/3 |
| 6,934,848 B1 | * | 8/2005 | King et al. | 713/182 |
| 6,966,004 B1 | * | 11/2005 | Jin et al. | 726/5 |
| 6,976,164 B1 | * | 12/2005 | King et al. | 713/156 |
| 7,016,877 B1 | * | 3/2006 | Steele et al. | 705/50 |
| 7,275,259 B2 | * | 9/2007 | Jamieson et al. | 726/8 |
| 7,284,691 B2 | * | 10/2007 | McGee et al. | 235/375 |
| 7,444,672 B2 | * | 10/2008 | Ellmore | 726/8 |

(Continued)

FOREIGN PATENT DOCUMENTS

| | | |
|---|---|---|
| JP | 2001-134534 A | 5/2001 |
| JP | 2003-85141 A | 3/2003 |
| JP | 2003-296277 A | 10/2003 |

OTHER PUBLICATIONS

R. Housley et al, IETF RFC2459, "Internet x.509 Public Key Infrastructure Certificate and CRL Profile", Network Working Group, Jan. 1999, pp. 1-129.

*Primary Examiner* — Christopher A Revak
(74) *Attorney, Agent, or Firm* — Sidley Austin LLP

(57) ABSTRACT

Provided are an authentication method, authentication system and a terminal device in which the authentication of a non-participating third node is can be simplified and can be executed in the case of multicast by using an authentication ticket in a distributed processing network system, the non-participating third node being intended to access each of the nodes, including a first and a second node, constituting a workgroup. The first node that has already participated in the workgroup authenticates the third node intended to participate in the workgroup and issues the authentication ticket including the signatures of both nodes, and when the authentication ticket is submitted to the second node, the second node permits the third node to access, without password-based-authentication, by authenticating the first node and the second node which have signed the authentication ticket.

13 Claims, 16 Drawing Sheets

U.S. PATENT DOCUMENTS

| | | | |
|---|---|---|---|
| 7,523,490 B2 * | 4/2009 | Guo et al. | 726/10 |
| 7,540,022 B2 * | 5/2009 | Barari et al. | 726/10 |
| 7,653,933 B2 * | 1/2010 | Miao | 726/4 |
| 7,748,028 B2 * | 6/2010 | Sato et al. | 726/5 |
| 7,810,136 B2 * | 10/2010 | Guo et al. | 726/3 |
| 2005/0076244 A1 * | 4/2005 | Watanabe | 713/201 |
| 2006/0059546 A1 * | 3/2006 | Nester et al. | 726/5 |
| 2009/0260066 A1 * | 10/2009 | Miller et al. | 726/6 |

* cited by examiner

| HOST NAME | IP ADDRESS | MAC ADDRESS |
|---|---|---|
| PC2 | 192.168.0.112 | 00-11-22-33-44-02 |
| PC9 | 192.168.0.119 | 00-11-22-33-44-09 |

TL2(TL)

| HOST NAME | IP ADDRESS | MAC ADDRESS |
|---|---|---|
| PC1 | 192.168.0.111 | 00-11-22-33-44-01 |
| PC3 | 192.168.0.113 | 00-11-22-33-44-03 |
| PC4 | 192.168.0.114 | 00-11-22-33-44-04 |
| PC7 | 192.168.0.117 | 00-11-22-33-44-07 |

TL6(TL)

| HOST NAME | IP ADDRESS | MAC ADDRESS |
|---|---|---|
| PC3 | 192.168.0.113 | 00-11-22-33-44-03 |
| PC5 | 192.168.0.115 | 00-11-22-33-44-05 |
| PC7 | 192.168.0.117 | 00-11-22-33-44-07 |
| PC8 | 192.168.0.118 | 00-11-22-33-44-08 |

TL7(TL)

| HOST NAME | IP ADDRESS | MAC ADDRESS |
|---|---|---|
| PC2 | 192.168.0.112 | 00-11-22-33-44-02 |
| PC6 | 192.168.0.116 | 00-11-22-33-44-06 |
| PC8 | 192.168.0.118 | 00-11-22-33-44-08 |
| PC9 | 192.168.0.119 | 00-11-22-33-44-09 |

TL8(TL)

| HOST NAME | IP ADDRESS | MAC ADDRESS |
|---|---|---|
| PC6 | 192.168.0.116 | 00-11-22-33-44-06 |
| PC7 | 192.168.0.117 | 00-11-22-33-44-07 |
| PC9 | 192.168.0.119 | 00-11-22-33-44-09 |

TL9(TL)

| HOST NAME | IP ADDRESS | MAC ADDRESS |
|---|---|---|
| PC1 | 192.168.0.111 | 00-11-22-33-44-01 |
| PC5 | 192.168.0.115 | 00-11-22-33-44-05 |
| PC7 | 192.168.0.117 | 00-11-22-33-44-07 |
| PC8 | 192.168.0.118 | 00-11-22-33-44-08 |

AUTHENTICATION SYSTEM, AUTHENTICATION METHOD AND TERMINAL DEVICE

This application is based on Japanese Patent Application No. 2007-130334 filed on May 16, 2007, in Japanese Patent Office, the entire content of which is hereby incorporated by reference.

TECHNICAL FIELD

The present invention relates to an authentication method, which executes an authentication of a non-participating node, which attempts to access a node forming a workgroup, and an authentication system in a network system, and a terminal device which function as a node of a work group.

BACKGROUND

In recent years, the network which has a communication form where data is transmitted and received freely among the any nodes constituting a network has come into popular use.

As a typical form, there is a form of the communication network called P2P (Peer to Peer). P2P is a usage form of the network, which exchanges information directly among a plurality of unspecified nodes. There are two kinds of P2P. One kind of P2P technically requires mediation of a central server and the other kind of P2P transfers data with a bucket brigade system.

In the network configuration of such distributed processing, in order to execute direct connection between any nodes and to transmit and receive file information, a degree of freedom in communication was improved and it became convenient. On the other hand, there was a tendency to increase danger in the security matter, such as exploitation of file information by a third party and careless data outflow.

When communicating between nodes by a direct connection, the technology where a corresponding node is authenticated using an encryption process and a signature, has been employed in order to improve security.

In addition, generally, a plurality of nodes which configure a network forms a workgroup, where the nodes (logged) in the workgroup verify that they are logged in the same workgroup using a password, and they thus permit each other to access. However, also in this case, when the node communicates with a plurality of nodes of the same workgroup, the node had to be subjected to password-based-authentication each time the node accessed each node in order to secure security.

In order to perform such password-based-authentication, there was also a case in which plurality of exchanges are needed. In addition, the input operation took much time and effort, and verification took time. Therefore, these were troublesome.

In order to efficiently attain such a mutual authentication process, a technology to simplify the authentication process by issuing an authentication ticket has been proposed (refer to Unexamined Japanese Patent Application Publications Nos. 2001-134534, 2003-85141 and 2003-296277).

In Unexamined Japanese Patent Application Publication No. 2001-134534, disclosed is a technique where the information encrypted by the public key of the server stored in a certificate authority proxy server is sent to the sever through an authentication proxy sever when the server authenticates the client. However, with this technology, a communication is always conducted through the certificate authority proxy server. A communication is not completed by the direct communication between any nodes.

In Unexamined Japanese Patent Application Publication No. 2003-85141, disclosed is a type of a technology in which an authentication system first authenticates a user, and then the system issues a ticket. However, this system has the form in which the authentication system exist between the service providing system and the user, and a direct connection between any nodes is not intended to be implemented.

In Unexamined Japanese Patent Application Publication No. 2003-296277, proposed is a method in which a non-logged in node gets an authentication ticket from a network device (WWW application) which the non-logged in node has accessed. This system has an authentication server separately, which authenticates the non-logged in node. However, in this technology, only the communication to a particular WWW application is conducted using the authentication ticket, and an inquiry to the authentication server is required every time a communication between any nodes is conducted. It is troublesome to use the authentication ticket this way.

Therefore, in order to communicate by directly connecting between any nodes in a distributed processing network, there is especially desired a usage form of the authentication ticket in which an authentication process including a verification of passwords for getting logged in, in other word, accessing each of the logged in nodes can be simplified and can be efficiently executed.

SUMMARY

Therefore, an object of the present invention is to solve the aforementioned problem and t provide an authentication method and an authentication system in which the authentication of a non-logged in node attempting to access each of the nodes constituting a workgroup in a network system can be simplified by using a authentication ticket. Another object of the present invention is to provide an authentication method and an authentication system which can also be used in a case of multicasting in a distributed processing network system.

In view of forgoing, one embodiment according to one aspect of the present invention is an authentication method for authenticating a third node which applies to participate in a workgroup comprised of a first node and a second node which are in a network system, the authentication method comprising the steps of:

transmitting a temporary authentication ticket including a digital signature of the third node from the third node to the first node;

authenticating the third node by the first node based on the digital signature of the temporary authentication ticket received from the third node;

transmitting a password for participating in the workgroup from the third node to the first node;

verifying by the first node the password received from the third node;

generating a regular authentication ticket by the first node by adding a digital signature of the first node to the temporary authentication ticket to transmit the regular authentication ticket to the third node in a case where the third node has been successfully authenticate based on the digital signature, and the password is correct;

transmitting from the third node to the second node the regular authentication ticket received from the third node;

authenticating the first node and the third node by the second node based on the digital signatures of the regular authentication ticket received from the third node; and causing the second node to permit the third node to access, as a node of the workgroup, the second node in a case where the first node and the third node have been successfully authenticated.

According to another aspect of the present invention, another embodiment is an authentication system for authenticating a third node which applies to participate in a workgroup comprised of a first node and a second node which are in a network system, the authentication system comprising:

the first node; the first node including:

a first authentication section which is adapted to authenticate the third node based on a digital signature of a temporary authentication ticket received from the third node;

a password verification section which is adapted to verify a password received from the third node;

a first authentication ticket generating section which is adapted to add a digital signature of the first node to the temporary authentication ticket to generate a regular authentication ticket therefrom when the first authentication section has successfully authenticated, and the password verification section has successfully verified the password; and a first authentication ticket transmitting section which is adapted to transmit to the third node the regular authentication ticket generated by the first authentication ticket generating section, the second node; the second node including:

a second authentication section which is adapted to authenticate the first node and the third node based on digital signatures of the regular authentication ticket received from the third node; and a permission section which is adapted to permit the third node to access, as a node of the workgroup, the second node when the second node has successfully authenticated the first node and the third node, and the third node; the third node including:

a second authentication ticket generating section which is adapted to generate the temporary ticket including the digital signature of the third node;

a second authentication ticket transmitting section which is adapted to transmit to the first node the temporary authentication ticket generated by the second authentication ticket generating section;

a password transmission section which is adapted to transmit to the first node the password for participating in the workgroup;

a storage section which is adapted to store the regular authentication ticket received from the first node; and a third authentication ticket transmitting section which is adapted to transmit the regular authentication ticket to the second node when the third node applies to access the second node.

According to another aspect of the present invention, another embodiment is a terminal device which functions as a node for constituting a workgroup on a network, the terminal device comprising:

a second authentication ticket generating section which is adapted to generate a temporary authentication ticket including a digital signature of the terminal device when the terminal device is not in the workgroup;

a second authentication ticket transmitting section which is adapted to transmit the temporary authentication ticket generated by the second authentication ticket generating section to a first node constituting the workgroup;

a password transmission section which is adapted to transmit to the first node a password for participating in the workgroup;

a storage section which is adapted to receive and store a regular authentication ticket which has been generated in the first node after the terminal device was authenticated by the first node;

a second authentication ticket transmitting section which is adapted to transmit the regular authentication ticket stored in the storage section to a second node when the terminal device accesses the second node;

a first authentication section which is adapted to authenticate a third node based on a digital signature of a temporary authentication ticket received, when the terminal device is in the workgroup, from the third node;

a password verification section which is adapted to verify a password received from the third node;

a first authentication ticket generating section which is adapted to add the digital signature of the terminal device to the temporary authentication ticket received from the third node to generate a regular authentication ticket when the first authentication section has successfully authenticated the third node, and the password verification section has successfully verified the password received from the third node;

a first authentication ticket transmitting section which is adapted to transmit to the third node the regular authentication ticket generated by the first authentication ticket generating section;

a second authentication section which is adapted to authenticate a forth node and a fifth node based on digital signatures of a regular authentication ticket received, when the terminal device is in the workgroup, from the fourth node, the received regular authentication ticket including a digital signature of the fifth node, a permission section which is adapted to permit the fourth node to access, as a node of the workgroup, the terminal device when the second authentication section has successfully authenticated the fourth node and the fifth node.

BRIEF DESCRIPTION OF THE DRAWINGS

FIG. 4 is a drawing illustrating examples of connection table TL of the node 2 correlated as FIG. 3.

DETAILED DESCRIPTION OF THE PREFERRED EMBODIMENT

Hereinafter, the embodiment of the present invention will be explained with reference to the accompanying drawings.

[Entire Constitution of the Network]

Figure 1:
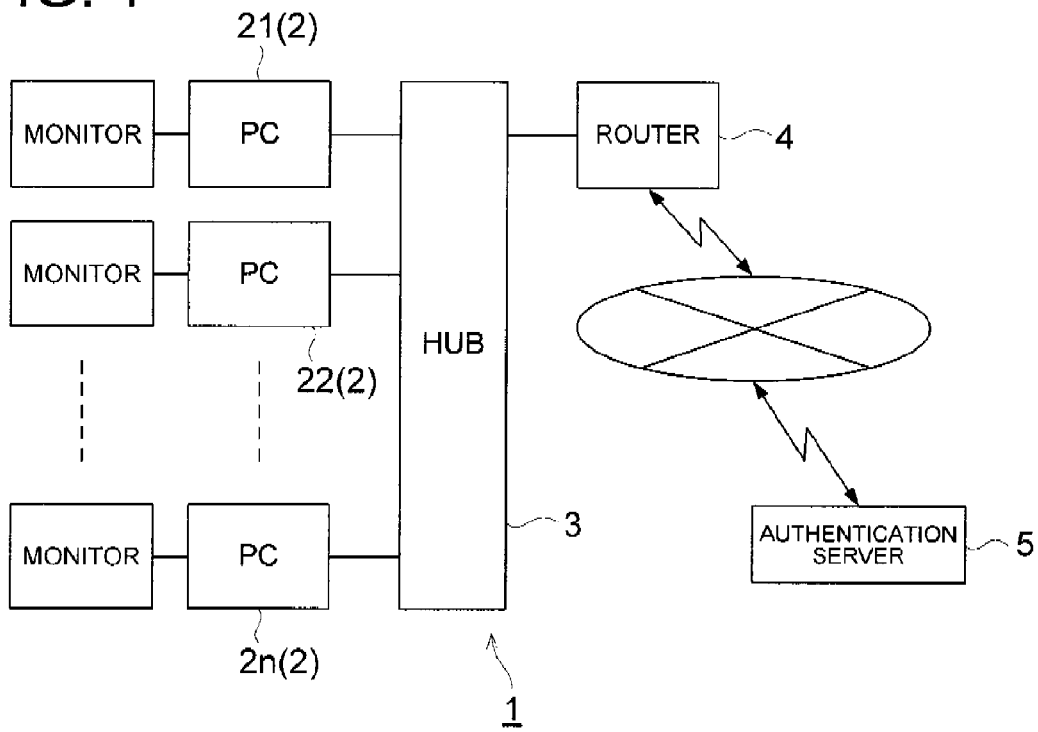
FIG. 1 is a drawing illustrating an example of entire configuration of a network 1.

FIG. 1 is a drawing showing the entire constitution example of a network 1. By referring to FIG. 1, the entire constitution of the network 1 according to the embodiment of the present invention will be described.

The network 1 according to the embodiment of the present invention, as shown in FIG. 1, is a LAN (local area network) composed of nodes such as a plurality of terminal devices 2 (21, 22, - - - , 2n), a switching hub 3, a router 4, and an authentication server 5. The terminal devices 2 are connected to the switching hub 3 by twisted pair cables in a star shape.

The terminal devices 2 as nodes constituting the network are a communication processing apparatus, which executes a data I/O process between itself and other devices such as a personal computer, a work station, or a printer. Hereinafter, a description will be made assuming that a node is just referred to as this terminal device as a personal computer.

Further, in this embodiment, a form of a communication network called a P2P (Peer to Peer) is adopted. The P2P is a usage form of a network for directly transmitting and receiving information between unspecified number of nodes, and there are two kinds of forms such as a form technologically requiring intermediation of a central server and a form for transferring data in a bucket brigade system. When the central server is required, it only provides a file search data base and controls connection of nodes, and transfer of data is executed through a direct connection between the nodes.

Further, even in a form that the central server performs an integrated processing as a host, there is also a system which can be occasionally changed such that any client functions as the central server. Such a network can be seen to practically have the same function as the P2P system in which direct transmission and reception of data between unspecified number of nodes is executed.

In this embodiment, the central server is not used, and the connection topology shown in FIG. 3 will be described later, where the direct connection and communication between the nodes (terminal devices) 2 associated with each other beforehand is executed. The connection between the nodes not associated with each other beforehand is to be established via the directly connected nodes. The authentication server (hereinafter referred to as an authentication node) 5 executes only the management related to a certificate for authentication and does not directly participate in the connection for communication. Further, also the router 4 only relay the communication between the nodes (terminal devices), and does not participate in a control such as acceptance and rejection of the connection of the node.

In the P2P, because the nodes mutually execute communication directly, important is a security where how the mutual nodes verify the validity of each other and how the room for unauthorized access is decreased. Therefore, a digital certificate issued by the authentication server (hereinafter referred to as an authentication node) 5 is used. As a digital certificate, the digital certificate of the specification X.509 is used. Further, the authentication node 5 authenticates each node in the network, in response to the inquiry from it, based on the submitted certificate (hereinafter, simply referred to as a certificate). Regarding its details, refer to IETF RFC2459, "Internet X.509 Public Key Infrastructure Certificate and CRL Profile". It should be noted that authentication is executed such that a digital certificate is first decrypted by the secret key held by the concerned node, and then, the digital certificate is verified after being decrypted by the public key included in the digital certificate Hereinafter, on the network according to this embodiment, there is described, from the aforementioned viewpoint, a method and a system of authentication using a certification ticket in the case where a non-participating node makes an access to the network constituting a work group where in which these nodes 2 establish a mutual connection for communication.

[Constitution of the Terminal Device as a Node]

Figure 2:
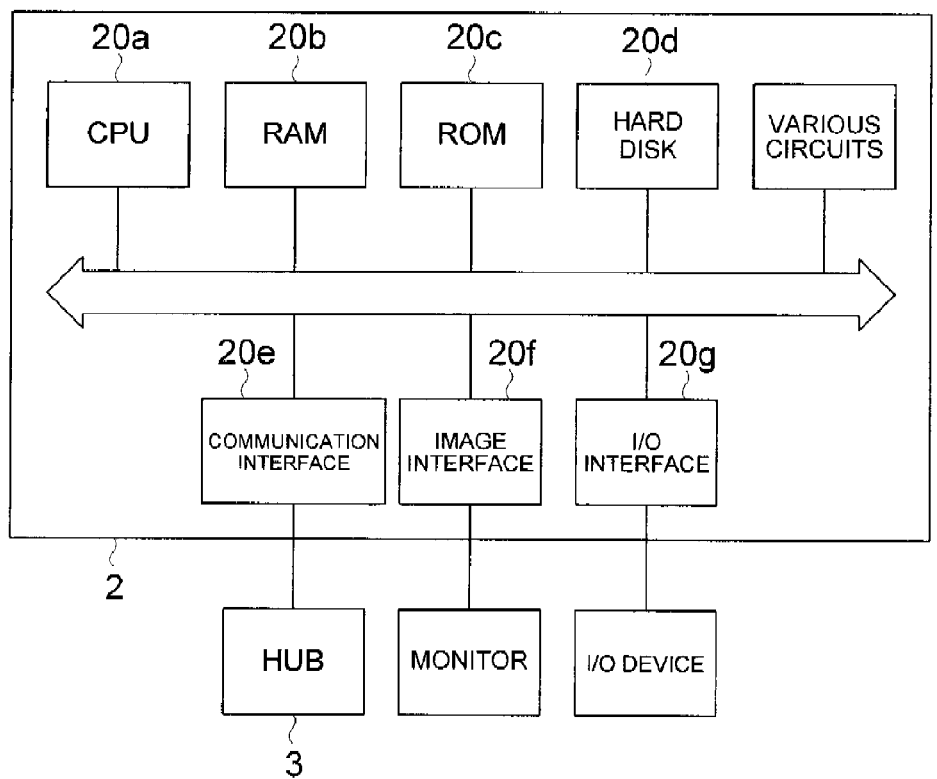
FIG. 2 is a drawing illustrating an example of a hardware configuration of a node (terminal device) 2 constituting the network 1.

FIG. 2 is a drawing showing an example of the hardware constitution of the node (terminal device) 2.

The terminal device 2, as shown in FIG. 2, is comprised of a CPU 20a, a RAM 20b, a ROM 20c, a hard disk 20d, a communication interface 20e, an image interface 20f, an I/O interface 20g, and other various circuits or devices.

The communication interface 20e is, for example, an NIC (Network Interface Card) and is connected to either port of the switching hub 3 via a twisted pair cable. The image interface 20f is connected to a monitor and sends a video signal for displaying to the monitor.

The I/O interface 20g is connected to an input device such as a keyboard or a mouse or an external storage device such as a CD-ROM drive. And the interface inputs from the input device a signal indicating the contents of the operation performed by a user to the input device. Or, the interface permits the external storage device to read the data recorded in the recording medium of the CD-ROM or the like and inputs it. Or, the interface outputs data to be written into the recording medium to the external storage device.

In the hard disk 20d, as will be described later by referring to the function block diagrams (FIGS. 5a and 5b), stored are the programs and data for realizing the functions of a connection table storing section 201, a connection table controlling section 202, a storage section such as a data storage section 203, a data handling section 204, a signature section 205, a connection management section 206, a data receiving section 207, a data analysis section 208, a data generation section 209, and a data transmission section 210 or the like. These programs and data are loaded into the RAM 20b as required, and the programs are executed by the CPU 20a.

To each of the nodes 2, as discrimination information for discrimination from the other nodes 2, the host name (machine name), IP address, and MAC address are given. The host name can be decided freely by the manager of the network 1. The IP address is given according to the regulations of the network 1. The MAC address is an address given fixedly to the communication interface 10e of the concerned node 2. Further, a unique ID may be used in place of a MAC address.

In this embodiment, to the nodes (terminal devices) 21, 22, - - - , the host names such as PC1, PC2, - - - are assumed to be assigned. Hereinafter, the nodes 2 may be mentioned by the host names.

[Connection Form of the Nodes]

Figure 3:
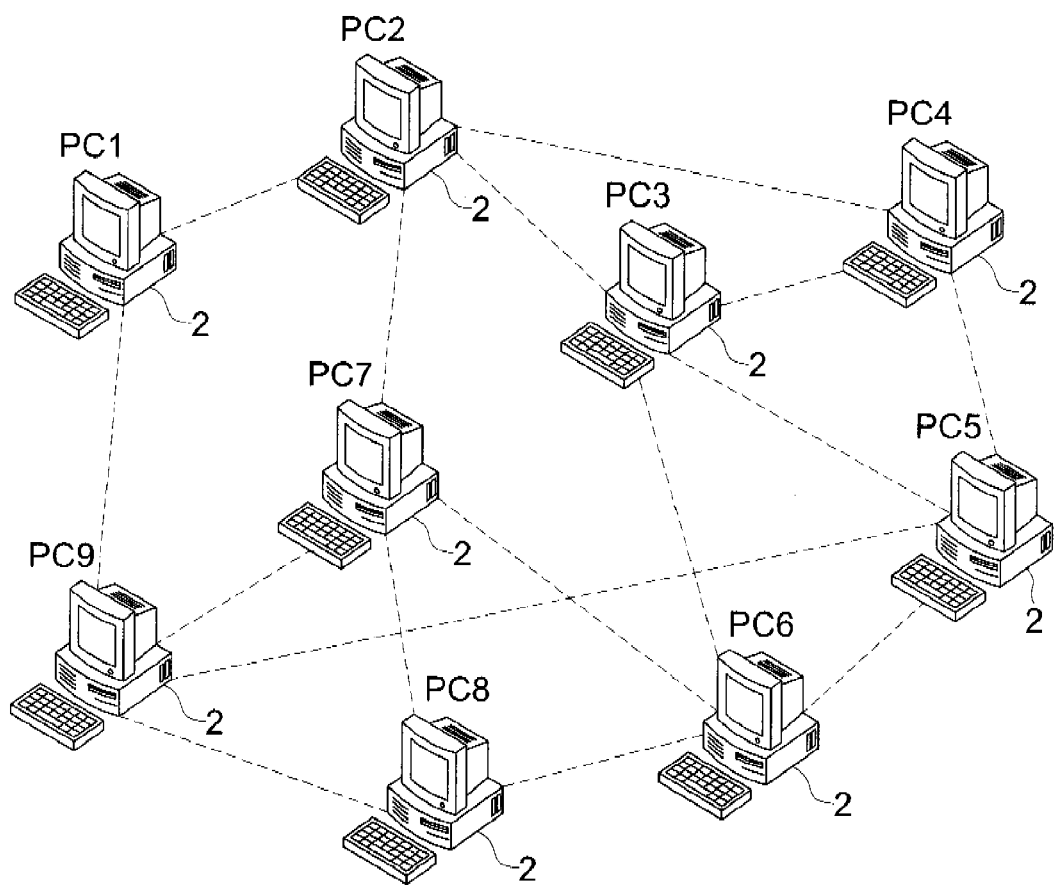
FIG. 3 is a drawing illustrating a topology of each node 2 constituting the network 1, namely, an example of a logical topology of the nodes.

FIG. 3 is a drawing showing the connection form of the nodes, that is, a theoretical topology example of the terminal device 2. The connection form of the nodes (encrypted communication processing apparatuses) will be described by referring to FIG. 3.

The nodes 2, as shown in FIG. 3, are assumed to be arranged in a virtual space. And, as shown by the dotted lines, each node is associated with at least another neighboring node in the virtual space. Moreover, by this association, all the nodes 2 are associated with each other directly or indirectly.

Further, "to be directly associated" is referred to as being coupled by single dotted line in FIG. 3 (for example, the relationship between PC1 and PC2 or PC9 shown in FIG. 3), and "to be indirectly associated" is referred to as being coupled via at least two dotted lines and one node (for example, the relationship between PC1 and PC4 shown in FIG. 3). The nodes 2 transmit data to other nodes 2 directly associated with themselves.

FIG. 4 is drawings showing the examples of the connection table TL of the nodes 2 associated as shown in FIG. 3. Each of the tables TL holds in table form a list of information for connection with other nodes 2 "associated directly" to which the each node can directly transmit data.

For example, in the PC1, PC2, PC6, PC7, PC8, and PC9 shown in FIG. 3, the connection tables TL1, TL2, TL6, TL7, TL8, and TL9 as shown in FIG. 4 are held respectively.

[Function of Each Section of the Terminal Device]

Figure 5A:
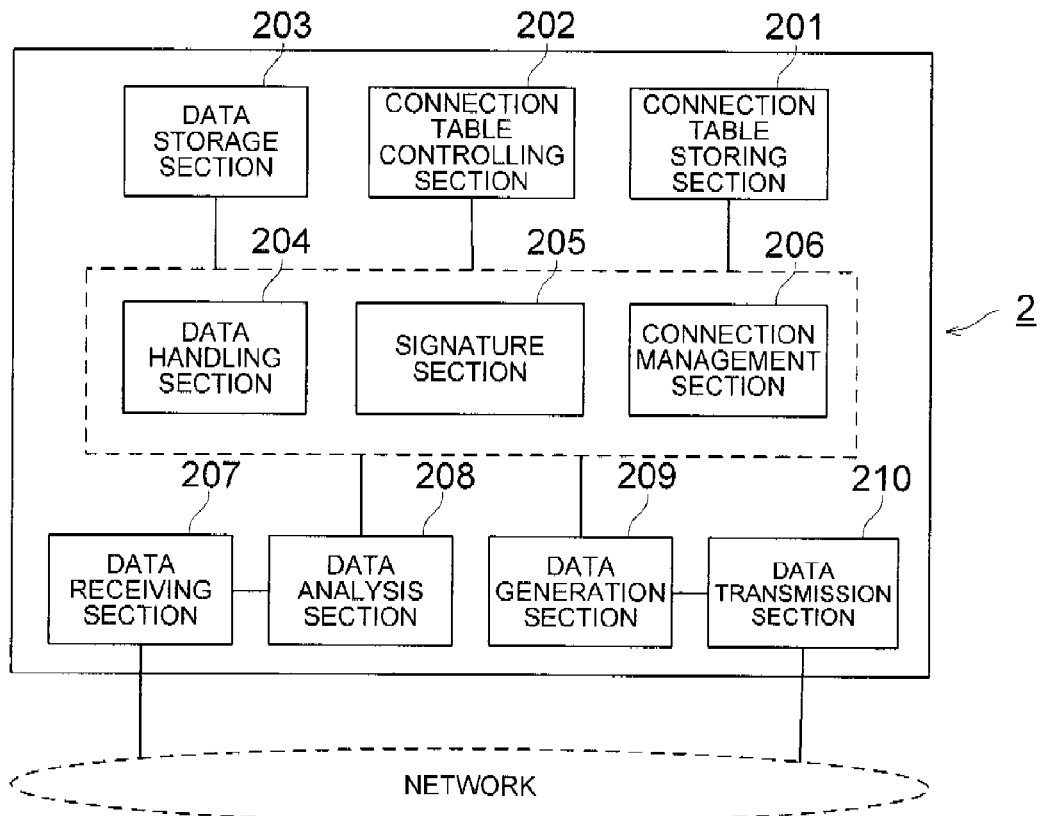
FIG. 5*a* is a drawing illustrating a block diagram of an example of a functional configuration of the node (terminal device) 2.

FIG. 5a is a block diagram showing a functional constitution example of the node (terminal device) 2. The processing function of each section of the node 2 will be described by referring to FIG. 5a.

The connection table storing section 201 stores the connection table TL indicating a list of the attributes such as the host name, IP address, and MAC address of another node 2 with which the node 2 itself is directly associated. For example, an example of the connection table stored in the connection table storing section 201 of each node is described already by referring to FIG. 4. The contents of these connection tables TL are generated beforehand by the manager on the basis of the association of the respective nodes 2.

The connection table controlling section 202 controls the connection table TL stored in the connection table storing section 201 aforementioned.

The data storage section 203 stores attribute data indicating the attributes of the concerned node 2 or a user, data required for the authentication (such as authentication ticket) of the concerned node 2 itself, a certificate revocation list (CRL), data used in an operating system (OS) or application software, data generated by the user using the application software, data such as an encryption key necessary to perform the encrypted communication processing, and the other various data as a file.

The data handling section 204 stores data in the data storage section 203 and performs a process of updating the data stored in the data storage section 203. For example, whenever the environment of the node 2 or the setting contents thereof are changed, the data handling section 204 updates the attribute data. Further, the data handling section 204 processes and temporarily stores data (information) acquired from other nodes.

A signature section 205 authenticates other nodes 2 based on digital signatures such as signatures of an authentication ticket transmitted from the concerned the other node 2. In addition, the signature section 205 verifies the transmitted password to put the validity into consideration in issuing the authentication ticket.

A connection management section 206 processes the application of the concerned node 2 for new participation in the workgroup. In addition, the connection management section 206 executes process of permitting access or process of issuing the authentication ticket in response to an application for participation from other nodes 2. The connection management section 206 also functions as a first authentication ticket generating section, a second authentication ticket generating section and a permission section of the present invention.

A data handling section 204, the signature section 205, and the connection management section 206 accordingly perform data communication with other nodes 2 of the network 1 through a data receiving section 207 and a data transmission section 210, if needed. The data handling section 204, the signature section 205, and the connection management section 206 accordingly refer to or update data of the connection table storing section 201 and the data storage section 203. The data transmission section 210 also functions as a first authentication ticket transmitting section, a second authentication ticket transmitting section, a third authentication ticket transmitting section and a password transmission section of the present invention.

Figure 5B:
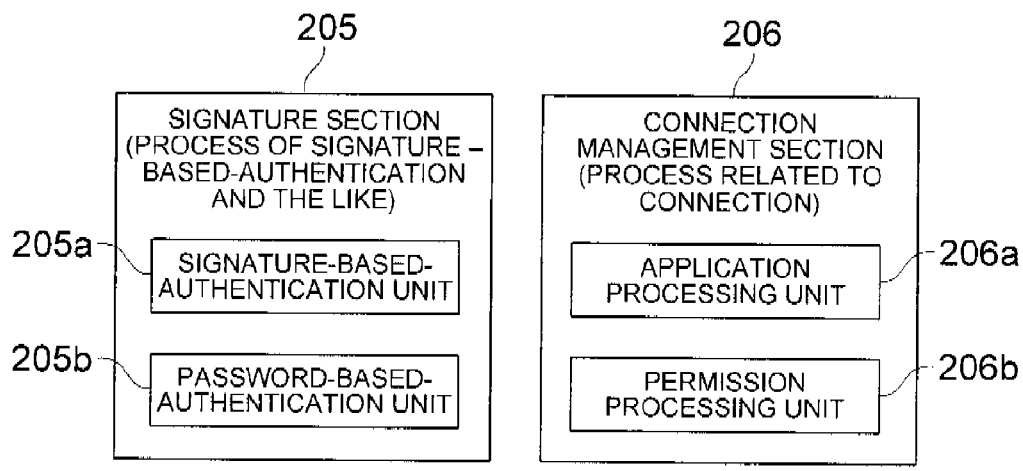
FIG. 5*b* is a drawing illustrating internal configurations of functions of a signature section 205 and a connection management section 206.

FIG. 5b is a drawing illustrating internal configurations of functions of the signature section 205 and the connection management section 206. There will be described, using FIG. 5b, the functions of the signature section 205 and the connection management section 206, namely, the processing functions of applying for participation in a workgroup, signature-based-authentication and password-based-authentication upon the application of participation from other nodes, and processes of issuing the authentication ticket and participation (log in) base on the above processes.

The signature section 205 includes a signature-based-authentication-unit 205a which authenticates by a received signature, and a password-based-authentication unit 205b which verifies a received password. These are controlled to perform the following processing operations.

The signature-based-authentication-unit 205a authenticates the node of the signature based on the signature of the authentication ticket or a temporary authentication ticket such an incomplete authentication ticket received as an application for participation in the workgroup. That is, it functions as a first authentication section and a second authentication section.

The password-based-authentication unit 205b receives the password from the successfully authenticated node and verifies the password for participation (login). That is, it functions as a password verification section of the present invention.

The password used for the verification may be characters and symbol strings set up arbitrarily or may be ID (identification information) unique to the node.

The connection management section 206 includes an application processing unit 206a which performs the application for participation in the workgroup, and a permission processing unit 206b which issues an authentication ticket or permits participation (login) based on the verification of password and the authentication. These are controlled to perform the following processing operations.

The application processing unit 206a submits an incomplete authentication ticket which includes its own signature, or submits a received regular authentication ticket, and applies participation in the workgroup. That is, it functions as a first participation applying section and a second participation applying section.

The permission processing unit 206b issues an authentication ticket based on the verification of password and the signature-based-authentication, or permits the participation in the workgroup based on the signature-based-authentication of the node from which the regular authentication ticket has been issued and the verification of the node which applies participation. That is, it functions as a first participation permission section and a second participation permission section.

Each processing in the above-mentioned signature section 205 and the connection management section 206 are described in detail in the description of the approval flow of participation mentioned later.

Returning to FIG. 5a, each part of the node (terminal device) 2 will be further described.

The data receiving section 207 performs the control management for performing data communication with other nodes 2. The data receiving section 207 receives the packet necessary for the node 2 out of the packets flowing through the network 1.

A data analysis section 208 distinguishes the type of the received data by extracting required information from the data received by the data receiving section 207 and analyzing the content of the extracted data.

A data generation section 209 generates the transmission data to be transmitted to other nodes 2 based on the direction of the data handling section 204, the signature section 205, or the connection management section 206.

The data transmission section 210 transmits the transmission data, which has been put in a packet form, generated by the transmission data generation section 209 to other nodes 2.

(Approval Flow of the Participation to the Workgroup)

In an embodiment of the present invention, when communicating among a plurality of nodes 2 which are directly or indirectly associated with each other is conducted, the non-participating node directly accesses to a node which is participating in the workgroup, an authentication node does not necessarily need to intervene at all times, password-based-authentication does not need to be repeated at every communication, and the authentication can be simply and effectively executed by exchanging authentication tickets.

The processing flow of this embodiment, which processes approval of an application for participation in the workgroup while keeping the process simple, is explained below by using FIG. 6.

Figure 6:
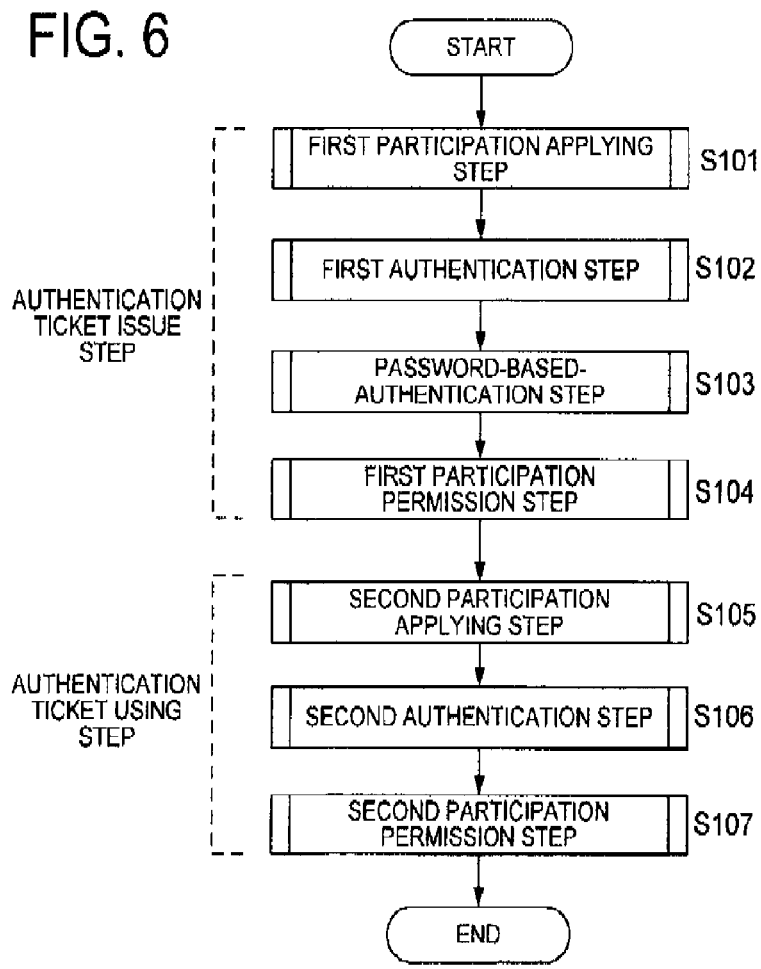
FIG. 6 is a drawing illustrating a flow chart showing a flow of the process of authentication in dealing with an application for participation to a workgroup.

FIG. 6 illustrates a flow chart showing a flow of a processing method of approving the application for participation according to the embodiment of the present invention.

STEP S101 to STEP S104 of FIG. 6 are an authentication ticket issuing step.

STEP S101 is a first participation applying step. In STEP S101, a non-participating node (third node) of a workgroup submits an incomplete (temporary) authentication ticket with its own signature to a node (first node) in the workgroup, and demands the approval for participation (step of transmitting a temporary authentication ticket).

STEP S102 is a first authentication step. In STEP S102, the first node verifies the validity of the non-participating node which has submitted the incomplete authentication ticket with the signature, or verifies that the authentication of the non-participating node has been completed (step of authenticating the third node). If the verification fails in STEP S102, the application for participation in the workgroup is rejected.

STEP S103 is a password-based-authentication step. In STEP S103, the first node receives an encrypted password from the non-participating node, and verifies the password. If the password-based-authentication is failed in STEP S103, the application for participation in the workgroup is rejected.

STEP S104 is a first participation permission step. In STEP S104, the first node issues a regular authentication ticket to which its own signature was added to the non-participating node in response to the validity of the non-participating node and the result of the verification of password.

STEP S105 to STEP S107 of FIG. 6 are an authentication ticket using steps, in which the procedure for obtaining the participation permission is simplified by using the issued authentication ticket.

STEP S105 is a second participation applying step. In STEP S105, the node not participating in the workgroup submits the received authentication ticket to a participating node (a second node) and applies for participation (step of transmitting the regular authentication ticket).

STEP S106 is a second authentication step. In STEP S106, the second node verifies, based on the signatures of the submitted authentication ticket, the validities of the issuing source (first node) and the non-participating node, or verifies that the authentication of the nodes has been completed (step of authenticating the first node and the third node). If the verification fails in STEP S106, the application for participation in the workgroup is rejected.

STEP S107 is a second participation permission step. In STEP S107, the second node permits the third node to participate in response to the authentication result of the issuing source (first node) and to the validity of the non-participating node (step of causing the second node to permit the third node to access).

The non-participating node participates (login) in the workgroup through the above flow, in other words, the password-based-authentication, which had been executed whenever it accesses the workgroup participating node, can be reduced to only once at the time of acquisition of the authentication ticket, and time and effort can be saved. In addition, since a conventional way of password-based-authentication needs a plurality of transmission and reception, multicast transmission is impossible. However, since the above-mentioned authentication method has to transmit the authentication ticket only once, multicast transmission also becomes possible.

The detailed flow of each step of FIG. 6 is described below.

<First Participation Applying Step>

Figure 7:
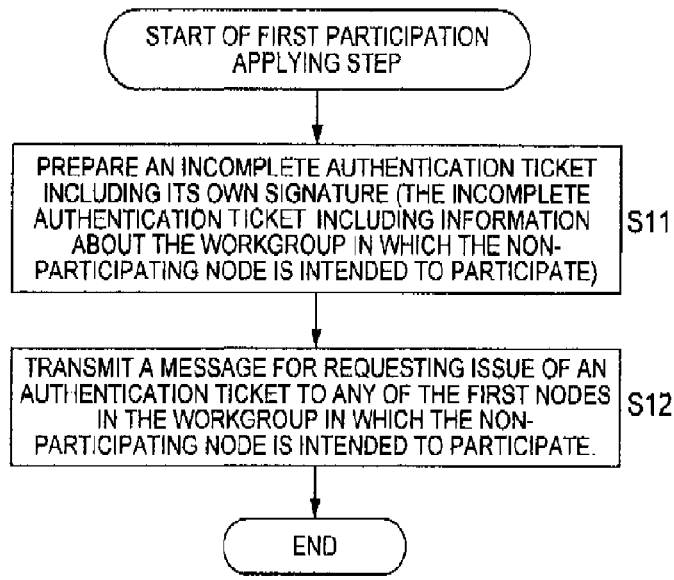
FIG. 7 is a drawing illustrating a flow chart showing a detailed flow of a first participation applying step of FIG. 6.

FIG. 7 illustrates the detailed processing flow in the first participation applying step of STEP S101 of FIG. 6. The first participation applying step is executed by the application processing unit 206a of the connection management section 206.

Figure 8:
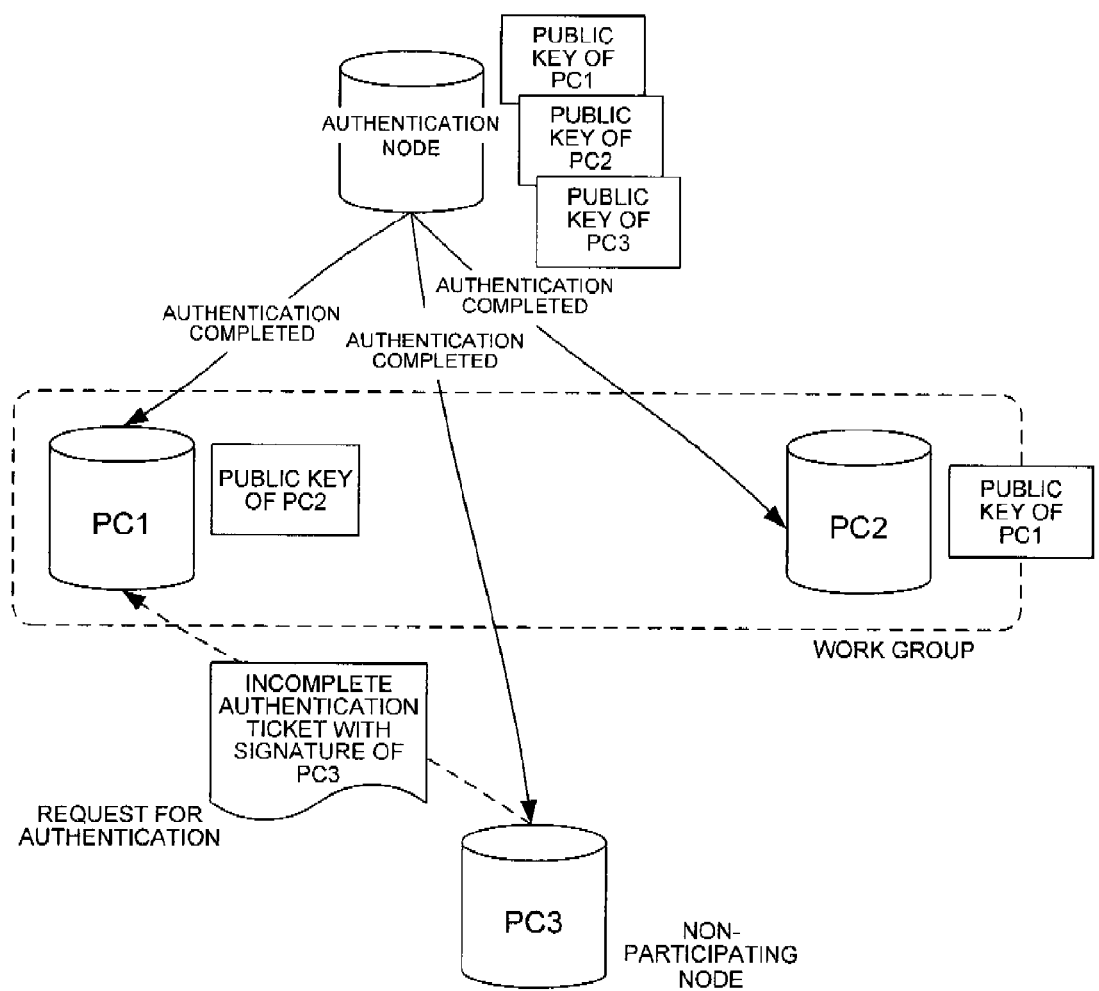
FIG. 8 is a drawing illustrating a situation where a PC3 not participating in the workgroup is applying a participating PC1 for participation to a participating PC1 according to the flow of FIG. 7.

FIG. 8 illustrates a situation as an example of the flow of FIG. 7. In the situation, the non-participating node (PC3), which is not in the workgroup in which the node (PC1) and the node (PC2) are participating, performs an application for participation in order to participate (login) in the workgroup by accessing the first node (PC1) to submit the incomplete authentication ticket with its own signature.

With reference to FIGS. 7 and 8, an example of the flow of the first participation applying step is explained.

In STEP S11 of FIG. 7, the non-participating node, which attempts to participate in the workgroup, prepares the incomplete authentication ticket including its own signature. Information regarding the workgroup in which the non-participating node attempts to participate is included in this authentication ticket. Although a plurality of workgroups may exist in the network, the aimed workgroup is identified by this information. Information regarding the workgroup may include the name or the ID of the workgroup.

In STEP S12, the non-participating node submits the incomplete authentication ticket with its own signature to any of the nodes participating in the workgroup to apply for participation. Its own signature is attached for receiving the authentication of itself as anode, and the ID (identification information) unique to the node is included in the signature information.

An application for participation in the workgroup may be submitted before the incomplete authentication ticket with the signature is submitted. The application and the submission may be changed corresponding to the verification form of the authority, which is mentioned later.

Furthermore, in this case, an application for participation also corresponds to a request for issue of an authentication ticket.

In FIG. 8, the PC3 as the non-participating node submits to the PC1, which is participating in the workgroup, the incomplete authentication ticket including a signature of the PC3, and applies for authentication. The authentication ticket needs the signature of the issuing source (node which is participating in the workgroup, in this example, it is PC1 or PC2), and the authentication ticket is still incomplete at this point when the authentication ticket does not have the signature of the issuing source.

In this example, the PC1, PC2 and the non-participating PC3 have been authorized by an authentication node, and they have only to verify each other's status of having been successfully authenticated. In addition, the PC1 and PC2 in the workgroup have already verified that they have been successfully authenticated, namely, the PC1 and PC2 have stored the public key of each other. They are in the situation where the PC1 and PC2 can verify, by themselves without troubling the authentication node, that they have already been authorized if they receive each other's signature. Further, the public key is included in the digital signature. Although the public keys are illustrated in FIG. 8, the public keys may be stored as a form of a digital certificate.

<First Authentication Step>

Figure 9:
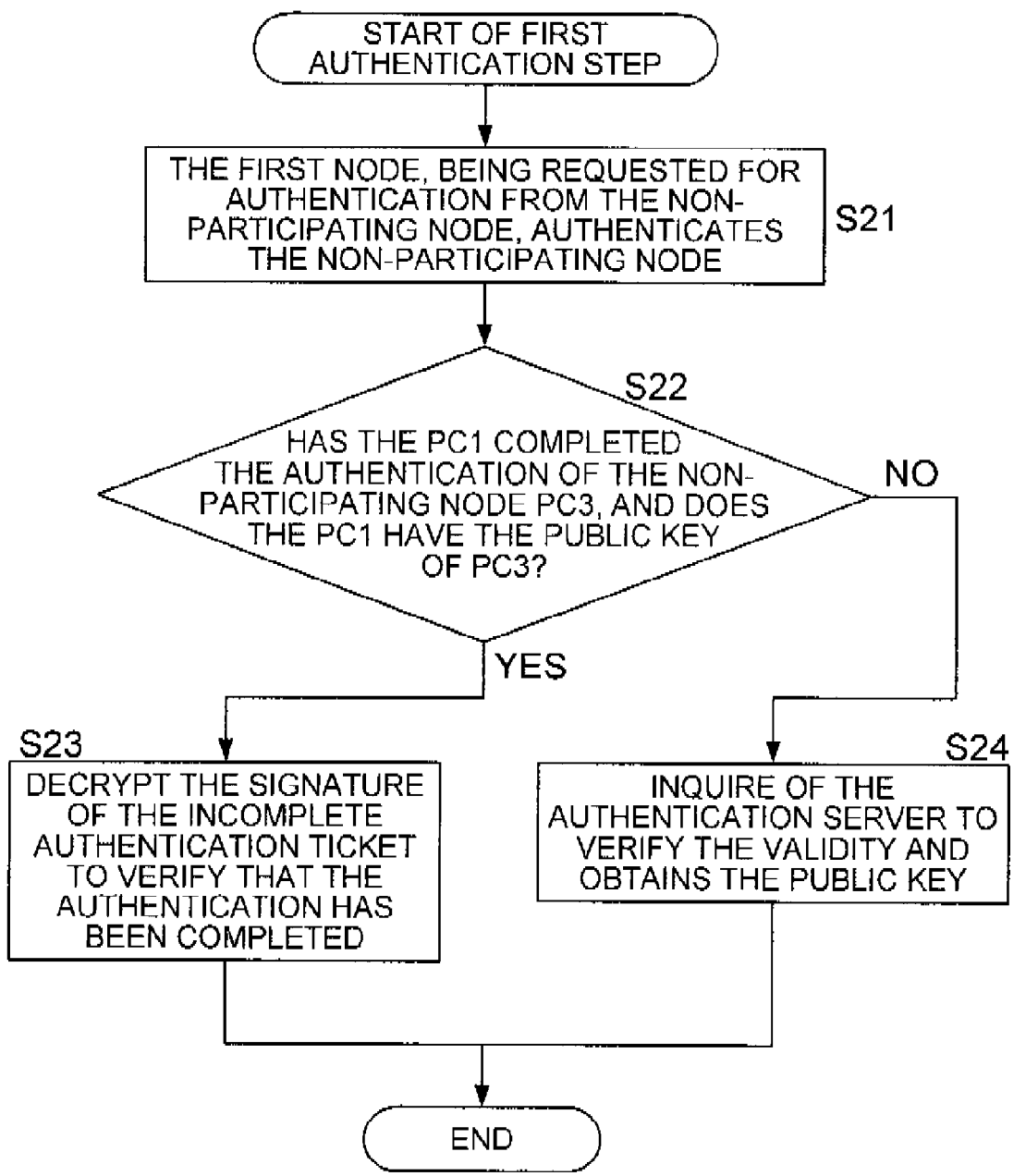
FIG. 9 is a drawing illustrating a flow chart showing a detailed flow of a first authentication step of FIG. 6.

FIG. 9 illustrates the detailed processing flow of the first authentication step of STEP S102 of FIG. 6. The first authentication step is executed by the signature-based-authentication-unit 205*a* of the signature section 205. If the authentication fails in STEP S102, the application for participation in the workgroup is rejected.

Figure 10:
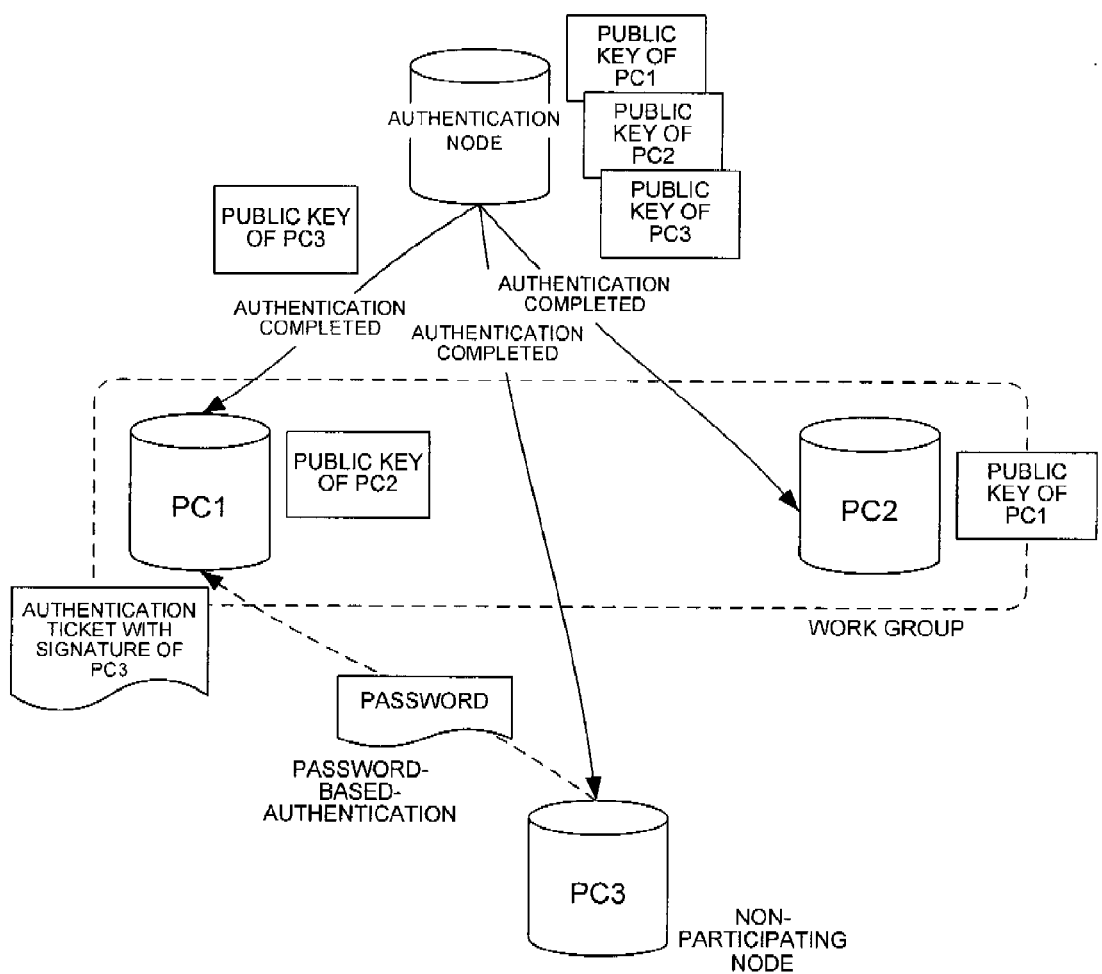
FIG. 10 is a drawing illustrating a situation where the PC1 in the workgroup is verifying the authentication of a non-logged in PC3 and is performing password-based-authentication to the PC3 according to the flows of FIG. 9 and FIG. 11.

FIG. 10 illustrates, as an example of the flow of FIG. 9, described is a situation where in order to authenticate the node (PC3) not participating in the workgroup, the first node (PC1) is acquiring a public key of the node (PC3) while verifying by inquiring of the authentication node.

With reference to FIGS. 9 and 10, an example of the flow of the first authentication step is described.

In STEP S21 of FIG. 9, the first participating node (hereinafter referred to as PC1), which received the incomplete authentication ticket with the signature of the non-participating node (hereinafter referred to as PC3), verifies whether the validity of the PC3 has been authorized. For that purpose, it is determined in the next step whether the PC1 has already authorized the PC3.

In STEP S22, it is determined whether PC1 stores the public key of the PC3. When the PC1 stores the public key of PC3 (STEP S22: YES), the PC1 authorized the PC3 in the past and then performs STEP S23. When PC1 does not store the public key of the PC3 (STEP S22: NO), the PC1 performs STEP S24.

In STEP S23, the PC1 decrypts the signature of the PC3 in the incomplete authentication ticket using the public key of the PC3 stored in the PC1 and verifies that the authentication of the PC3 has been completed. If the verification of completion of the authentication of the PC3 fails, the application for participation in the workgroup is rejected.

In STEP S24, the PC1 acquires the public key of PC3 while confirming the authority of the validity of the PC3 by inquiring of the authentication node. Hereinafter, PC1 continues to store the public key of the PC3. Thus, the second or later verification of the authority of the PC3 using signature needs only to decrypt the digital signature of the PC3 by the public key. If the confirmation of the authority of the validity of the PC3 fails, the application for participation in the workgroup is rejected.

Furthermore, the verification of the completion of the authentication of the PC3 may not be done in a method using signature. At the time of the application for participation, the PC1 can make the PC3 submit a device certificate issued by the authentication node to authenticate the PC3.

FIG. 10 illustrates the situation where the PC1 confirms the authority of the validity of PC3 by inquiring of the authentication node. At the same time, the PC1 acquires the public key of the PC3 from the authentication node. As described above, the PC1 stores the public key of the PC3 hereinafter, and the PC1 directly executes the signature-based-authentication at the time of the next or later application for participation, namely, the request for authentication.

<Password-Based-Authentication Step>

Figure 11:
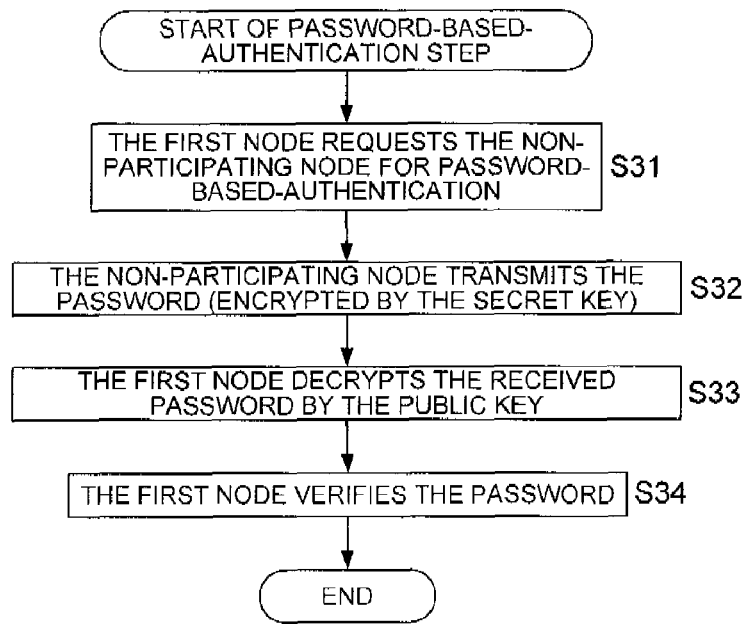
FIG. 11 is a drawing illustrating a flow chart showing a detailed flow of a password-based-authentication step of FIG. 6.

FIG. 11 illustrates the detailed processing flow of the password-based-authentication step of STEP S103 of FIG. 6. The password-based-authentication step is executed by the password-based-authentication unit 205*b* of the signature section 205. If the password-based-authentication fails in STEP S103, the application for participation in the workgroup is rejected.

As an example of the flow of FIG. 11, FIG. 10 illustrates the situation where the node (PC3) not participating in the workgroup submits the password to the first node (PC1) in order to get the approval of the participation in the workgroup by the password.

With reference to FIGS. 11 and 10, an example of the password-based-authentication step will be described.

In STEP S31 of FIG. 11, the PC1 requests the PC3 to submit the password for authentication. The PC3 submits the password to the PC1, and an encryption process is generally used for the safety of the password. Although the encryption process by a public key system is employed here for the verification of the password, other verification method of password, such as a challenge-response system, may be used.

In STEP S32, the PC3 encrypts the password with the secret key of the PC3, which is stored in the PC3, and transmits the password to the PC1 (step of transmitting a password).

In STEP S33, PC1 decrypts the encrypted password, which the PC1 received from the PC3, with the public key of the PC3, which is stored in the PC1. In STEP S34, the PC1 verifies the decrypted password (step of verifying by the first node the password). If the verification of the decrypted password fails, the application for participation in the workgroup is rejected.

In FIG. 10, the PC3 transmits the encrypted password to the PC1. The PC1 decrypts the password with the public key of the PC3, which is stored in the PC1, and verifies whether the password matches with the right password.

Generally in many cases, the transmission and reception of the password needs to be executed every time the node in the workgroup is accessed and thus needs to be repeated a plurality of times with much time and effort. In the embodiment of the present invention, this procedure does not have to be repeated by having the node which authenticated the non-participating node sign the authentication ticket.

Furthermore, the password used for the above-mentioned verification may be general character and symbol string which were arbitrarily set. In addition, an ID (identification information) unique to the nodes, such as a MAC Address, an IP address and a device ID may be used as a password.

<First Participation Permission Step>

Figure 12:
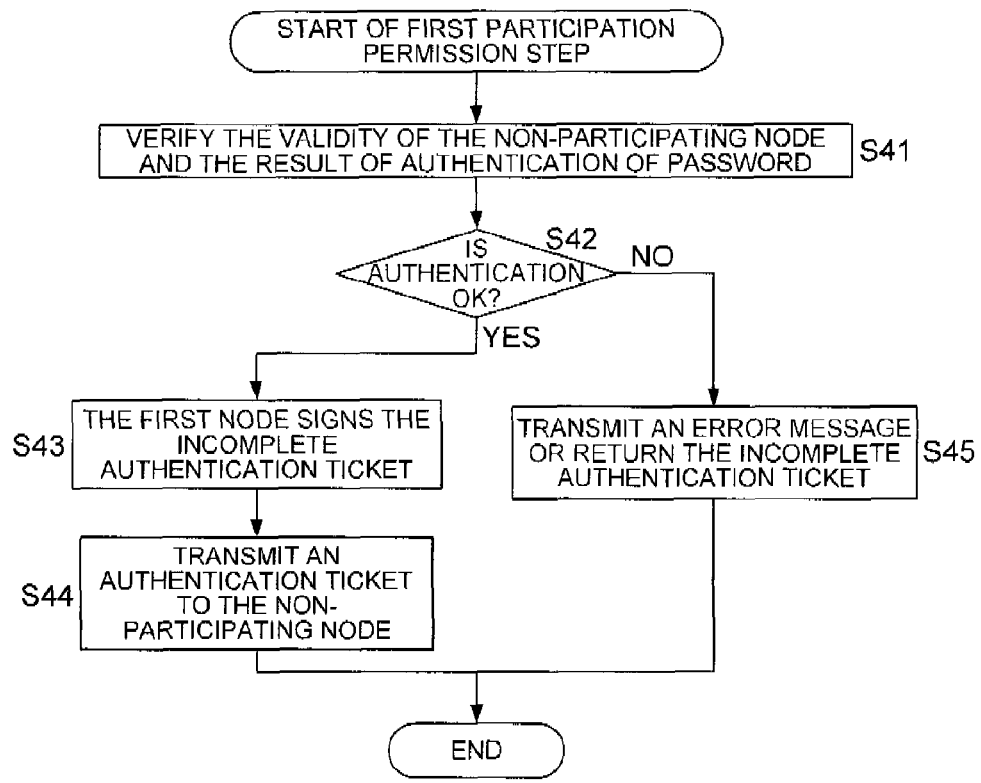
FIG. 12 is a drawing illustrating a flow chart showing a detailed flow of a first participation permission step of FIG. 6.

FIG. 12 illustrates the detailed processing flow of the first participation permission step of STEP S104 of FIG. 6. The first participation permission step is executed by the permission processing unit 206b of the connection management section 206.

Figure 13:
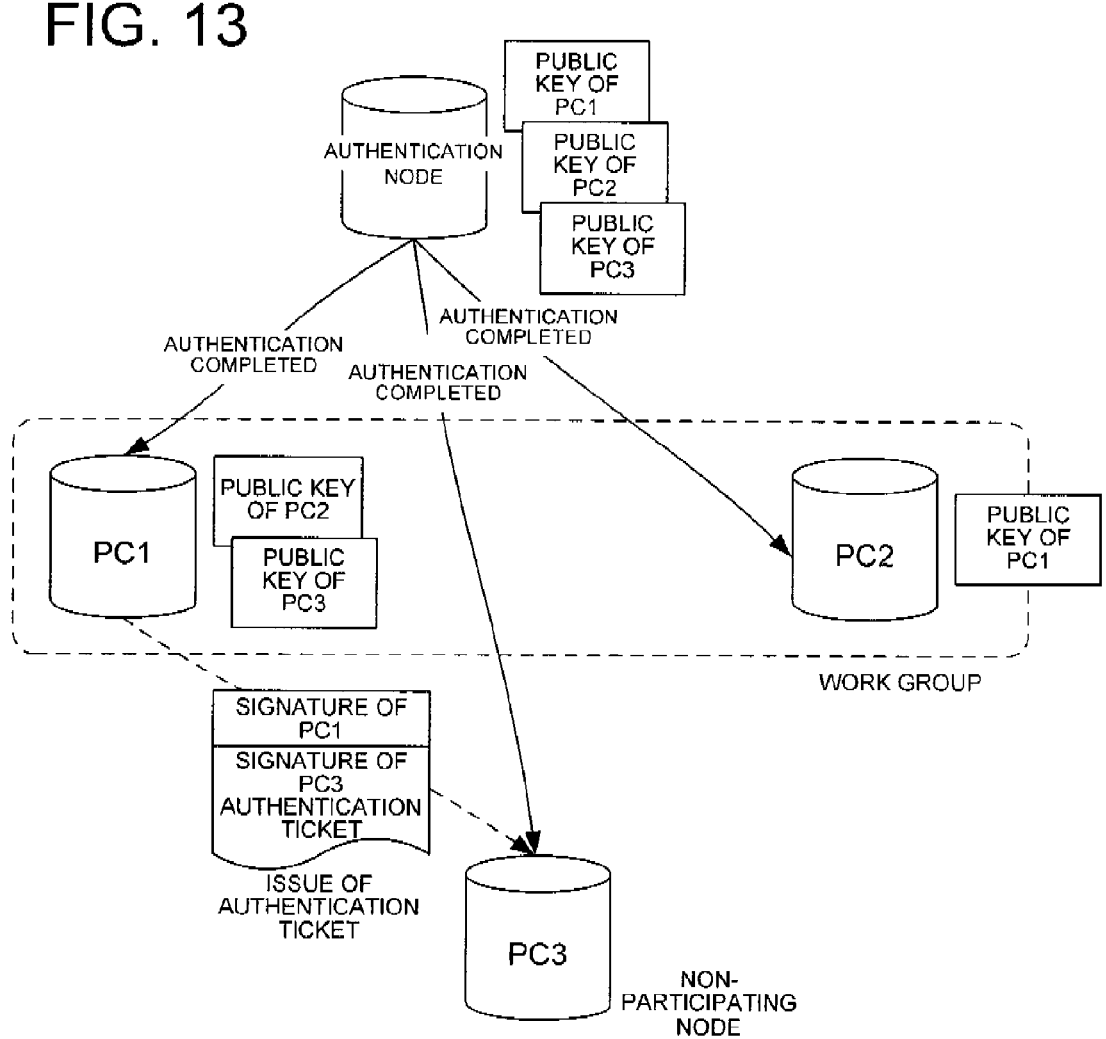
FIG. 13 is a drawing illustrating a situation where the PC1 in the workgroup is issuing an authentication ticket to permit the PC3 to participate in the workgroup according to the flow of FIG. 12.

As an example of the flow of FIG. 12, FIG. 13 illustrates the situation where the first node (PC1), which performed password-based-authentication to the node (PC3) not participating in the workgroup, permits the participation of the PC3 and issues an authentication ticket to which the PC1 has added its own signature.

With reference to FIGS. 12 and 13, an example of the flow of the first participation permission step will be described.

In STEP S41 of FIG. 12, the PC1 verifies whether the authentication of the validity of the PC1 has been completed and whether there is no problem with the password-based-authentication of the PC3. In the next step, the PC1 determines whether the authentication is OK, that is, whether the PC3 is permitted to participate in the workgroup.

In the case when the authentication is OK (STEP S42: YES) in STEP S42, STEP S43 is then executed. In the case when the authentication is NG (not good) (STEP S42: NO), STEP S45 is then executed.

In STEP S43, in order to permit the participation of the PC3, the PC1 makes a regular authentication ticket by adding its own signature to the incomplete authentication ticket. In STEP S44, the PC1 issues the authentication ticket to the PC3 (step of generating a regular authentication ticket the first node to transmit it).

In STEP S45, since the PC1 cannot permit the participation of the PC3, the PC1 returns an error message or the incomplete authentication ticket as is to the PC3.

In FIG. 13, the PC1 transmits the regular authentication ticket to which the signature of PC1 as the issuing source was added to the PC3. Hereinafter, by using this authentication ticket, the PC3 can omit the password-based-authentication when accessing other participating nodes.

The above-mentioned STEP S101 to STEP S104 were the authentication ticket issuing steps.

Following steps from STEP S105 to STEP S107 are authentication ticket using steps. These are steps which omits password-based-authentication by using the authentication ticket received by the PC3.

<Second Participation Applying Step>

Figure 14:
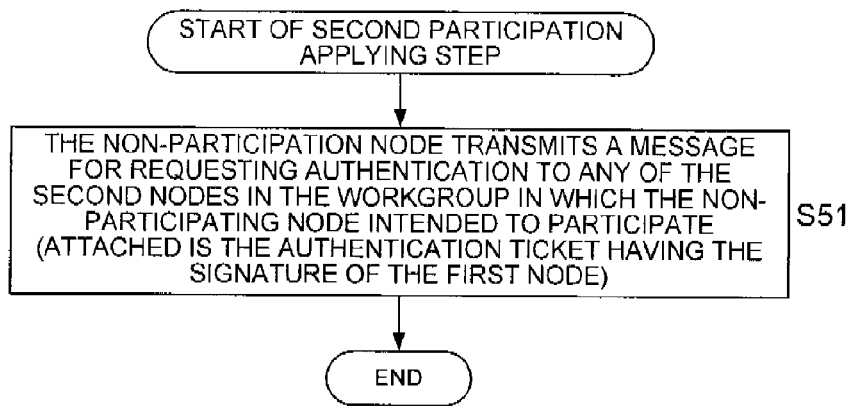
FIG. 14 is a drawing illustrating a flow chart showing a detailed flow of a second participation applying step of FIG. 6.

FIG. 14 illustrates the detailed processing flow of the second participation applying step of STEP S105 of FIG. 6. The second participation applying step is executed by the application processing unit 206a of the connection management section 206.

Figure 15:
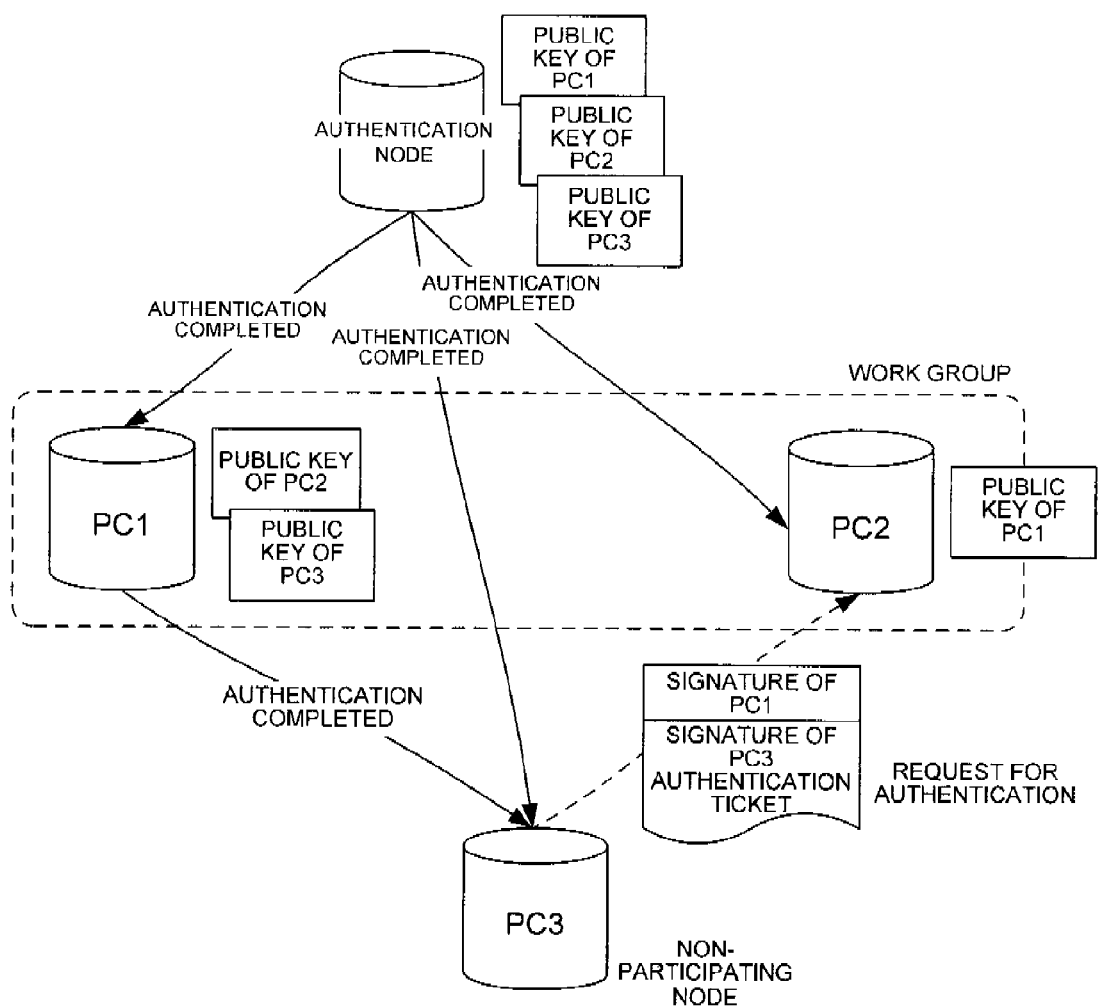
FIG. 15 is a drawing illustrating a situation where the PC3 is submitting the authentication ticket to the PC2 to apply for participation according to the flow of FIG. 14.

As an example of the flow of FIG. 14, FIG. 15 illustrates the situation where the node (PC3) not participating in the workgroup of the node (PC1) and the node (PC2) applies for the participation by accessing the second node (PC2) to submit the authentication ticket received from the first node (PC1) in order to participate (login) in the workgroup.

With reference to FIGS. 14 and 15, an example of the flow of the second participation request step will be described.

In STEP S51 of FIG. 14, the non-participating node, which attempts to participate in the workgroup, submits the authentication ticket received from the participating node (first node) to any other participating node (second node), and applies for participation. The information regarding the workgroup in which the non-participating node is intended to participate is included in this authentication ticket. In addition, the signatures of the non-participating node (third node) and the issuing source node (first node).

In FIG. 15, in order to apply for authentication, the PC3 being the non-participating node submits the authentication ticket containing the signatures of the PC3 and PC1 to the PC2 in the workgroup.

In this example, the PC1, the PC2 and the non-participating PC3 have already received the authentication of the authentication node, and PC1, PC2 and non-participating PC3 only need to verify that the authentications have been completed. In addition, the PC1 and PC2, which are participating in the workgroup, have verified the completion of the authentication to each other.

That is, the PC2 stores the public key of the PC1, and the PC2 is in the situation of being able to verify the completion of the authentication of the PC1 by itself without troubling an authentication node if the PC2 receives the signature of the PC1.

<The Second Authentication Step>

Figure 16:
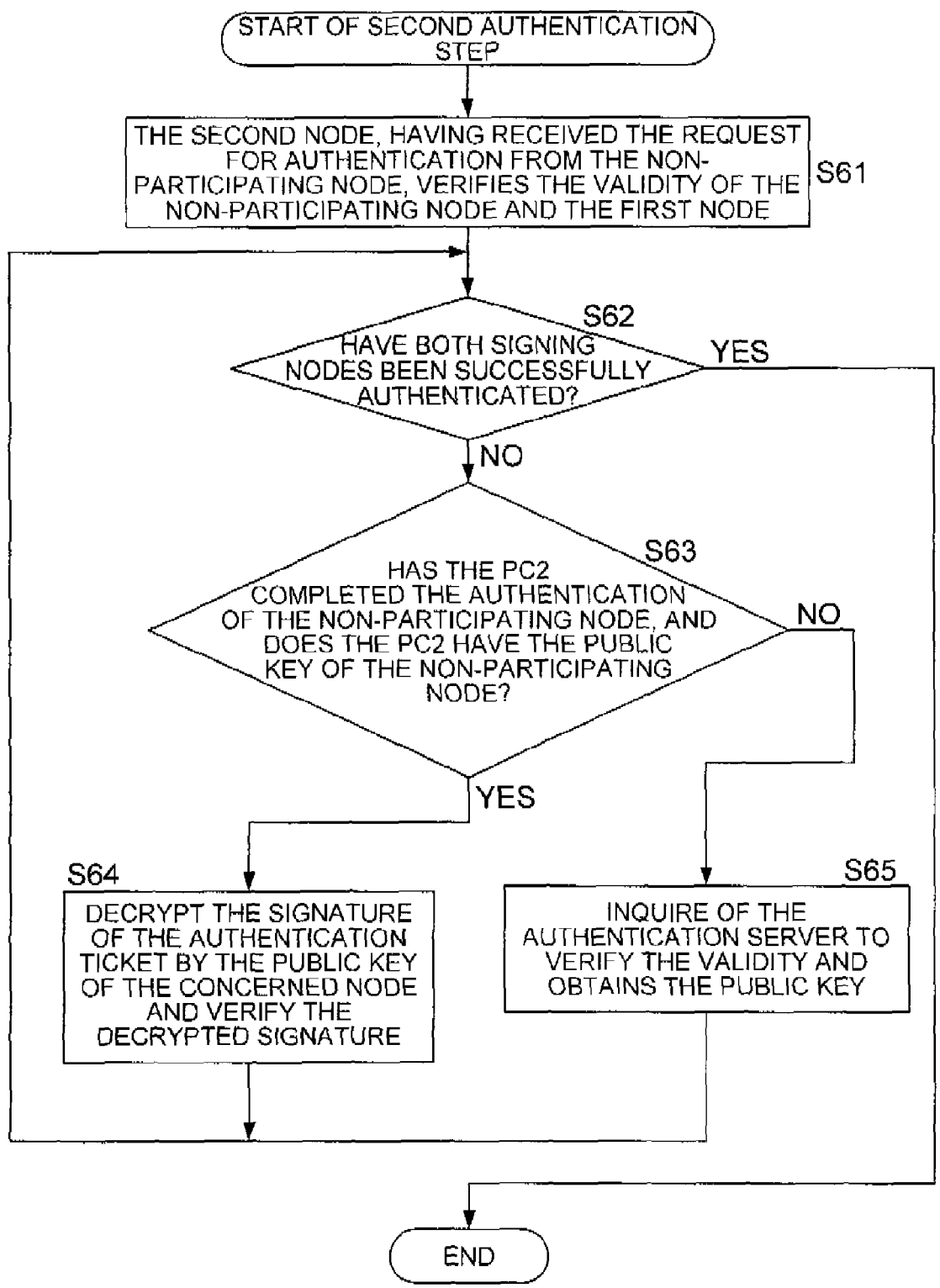
FIG. 16 is a drawing illustrating a flow chart showing a detailed flow of a second authentication step of FIG. 6.

FIG. 16 illustrates the detailed processing flow in the second authentication step of STEP S106 in FIG. 6. The second authentication step is executed by the signature-based-authentication-unit 205a of the signature section 205. If the authentication fails in STEP S106, the application for participation in the workgroup is rejected.

Figure 17:
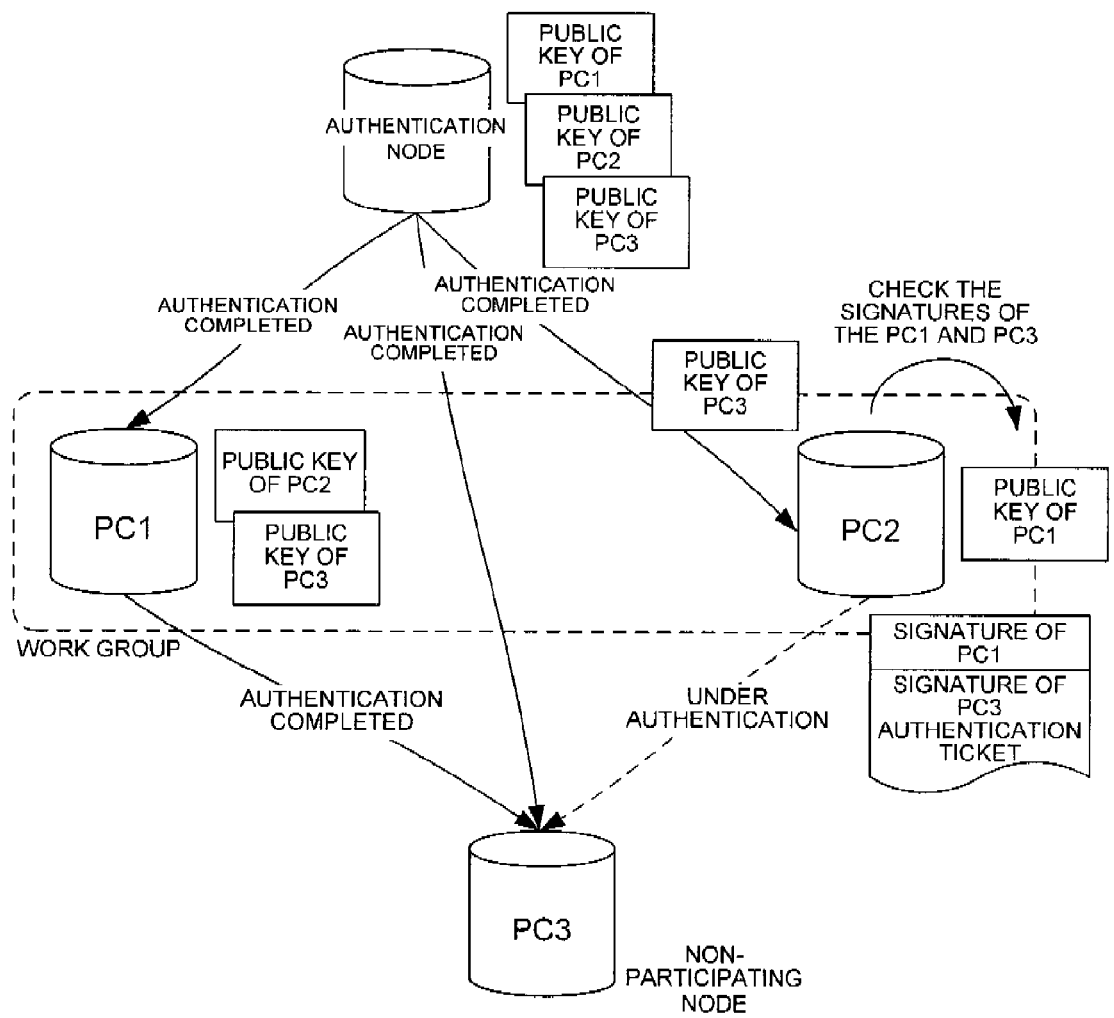
FIG. 17 is a drawing illustrating a situation where the PC2 is verifying the authentication of the PC3 according to the flow of FIG. 16.

FIG. 17 illustrates the situation, as an example of the flow of FIG. 16, where the PC2 is acquiring the public key of the node (PC3) while the second node (PC2) inquires of the authentication node to receive the confirmation of the authentication of the non-participating node (PC3) which has submitted the authentication ticket. In addition, FIG. 17 illustrates the situation where the second node (PC2) verifies that the issuing source (PC1) of the authentication ticked has been authorized.

With reference to FIGS. 16 and 17, an example of the flow of the second authentication step will be described.

At STEP S61 of FIG. 16, the second node (hereinafter referred to as PC2) that received the authentication ticket from the non-participating node (hereinafter referred to as PC3) verifies whether the validity of the PC3 has been authorized. In addition, it is also verified whether the validity of the first node (PC1) from which the authentication ticket was issued has been authorized. For that purpose, in the following steps, whether both authorities have been verified or not is first determined.

In STEP S62, it is determined whether the authentications of both PC1 and PC3 have been completed. In the case where the authentications of both PC1 and PC3 are completed (STEP S62: YES), the second authentication step ends. In the case where the authentication of either one has not been completed yet (STEP S62: NO), STEP S63 is executed to the node whose authentication has not yet completed.

In STEP S63, it is determined whether the PC2 stores the public key of the concerned node (PC1 or PC3). In the case where the public key is stored (STEP S63: YES), the authentication of the node had been completed in the past, and STEP S64 is executed. In the case where the PC2 does not store the public key of the concerning node (PC1 or PC3) (STEP S63: NO), the authentication of the node has not been completed, and STEP S65 is executed.

In STEP S64, the PC2 decrypts the signature of the concerned node of the authentication ticket using the public key of the concerned node stored in the PC2, and the PC2 verifies that authentication has been completed. If the verification fails, the application for participation in the workgroup is rejected.

In STEP S65, the PC2 acquires the public key of the concerned node while confirming the authority of the validity of the concerned node by inquiring of the authentication node. The PC2 continues to store the public key of the concerned node hereinafter, and the verification of the completion of the second and following authentication can be verified only by decrypting using the public key. If the confirmation of the authority of the validity of the concerned node fails, the application for participation in the workgroup is rejected.

The process from STEP S63 to STEP S64 to STEP S65 will be repeated twice until the authentications of both PC1 and PC3 are finished at STEP S62.

FIG. 17 illustrates the situation where the PC2 inquires of the authentication node to confirm the authority of the validity of the PC3. At the same time, the PC2 acquires the public key of the PC3 from the authentication node. In addition, the situation where the PC2 verifies the authority of the PC1 by decrypting the signature of the PC1 using the public key of the PC1 stored in the PC2 is illustrated.

As mentioned above, the PC2 stores the public key of the PC1, which is participating in the same workgroup, and the public key of the PC3, which newly participated in the workgroup, will also be stored in the PC2 hereinafter. If there is the next and following opportunity to perform the signature-based-authentication, the verification of the completion of the authentication can be directly performed using these public keys.

<The Second Participation Permission Step>

Figure 18:
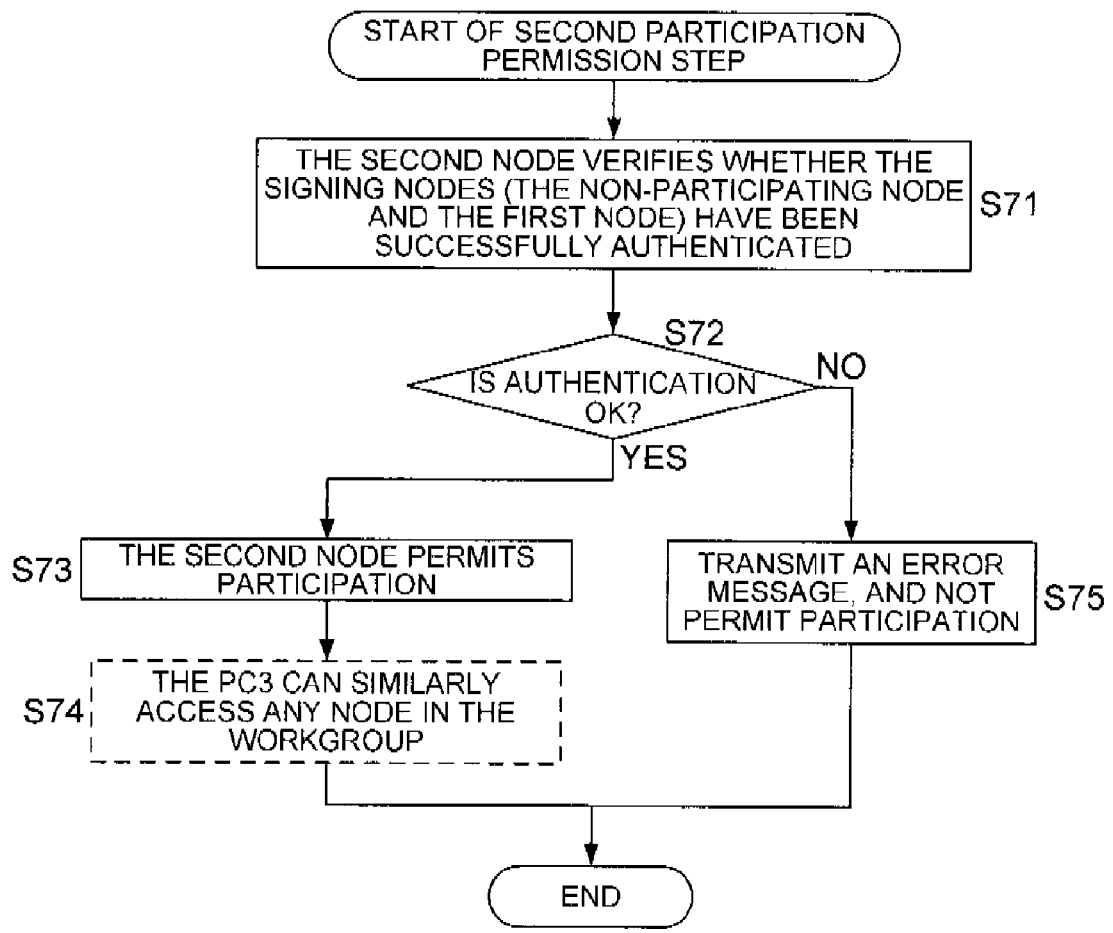
FIG. 18 is a drawing illustrating a flow chart showing a detailed flow of a second participation permission step of FIG. 6.

FIG. 18 illustrates the detailed processing flow in the second participation permission process of STEP S107 of FIG. 6. The second participation permission process is executed by the permission processing unit 206b of the connection management section 206.

Figure 19:
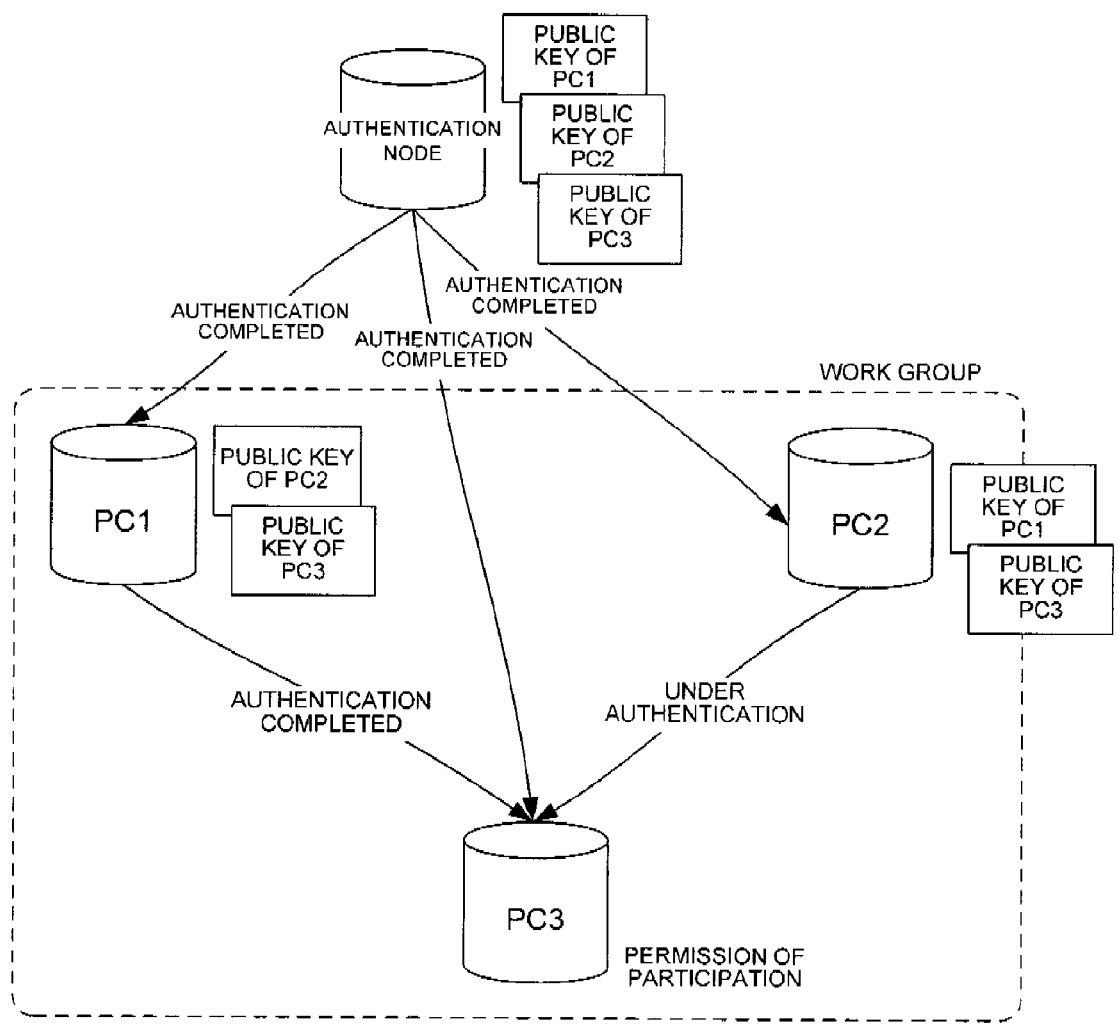
FIG. 19 is a drawing illustrating a situation where the PC2 is permitting the PC3 to participate according to the flow of FIG. 18.

FIG. 19 illustrates the situation, as an example of the flow of FIG. 18, where the node (PC2), which has verified the completion of authentication, is permitting the non-participating node (PC3), which has submitted the authentication ticket, to participate.

With reference to FIGS. 18 and 19, an example of the flow of the second participation permission process will be described.

In STEP S71 of FIG. 18, the PC2 verifies whether the both of the PC3 and PC1 have been successfully authenticated. At the following steps, whether the authentication is okay, namely, whether the participation in the workgroup is permitted is determined.

In the case where the authentication is O.K. in STEP S72 (STEP S72: YES), STEP S73 will be executed. In the case where the authentication is NG (not good) (STEP S72: NO), STEP S75 will be executed.

In STEP S73, the PC2 permits the PC3 to participate. At STEP S74, in a similar manner, the PC3 can access any other nodes in the workgroup easily by using the authentication ticket.

In STEP S75, since the PC2 cannot permit the PC3 to participate, the PC2 returns an error message to the PC3. Or the PC2 returns an invalid authentication ticket to PC3.

FIG. 19 illustrates the situation where the PC2 has completed the authentication of the PC3. Based on these processes, the authentication of the PC 3 was completed by both of the PC1 and PC2 in the workgroup. The PC1 and PC2 store the public key of each other. Similarly, both of the PC1 and PC2 store the public key of the PC3. In the case where there are other nodes in the workgroup, the PC3 is able to be similarly authenticated by those other nodes in the workgroup by using the authentication ticket.

(Example of Incomplete Authentication)

Figure 20:
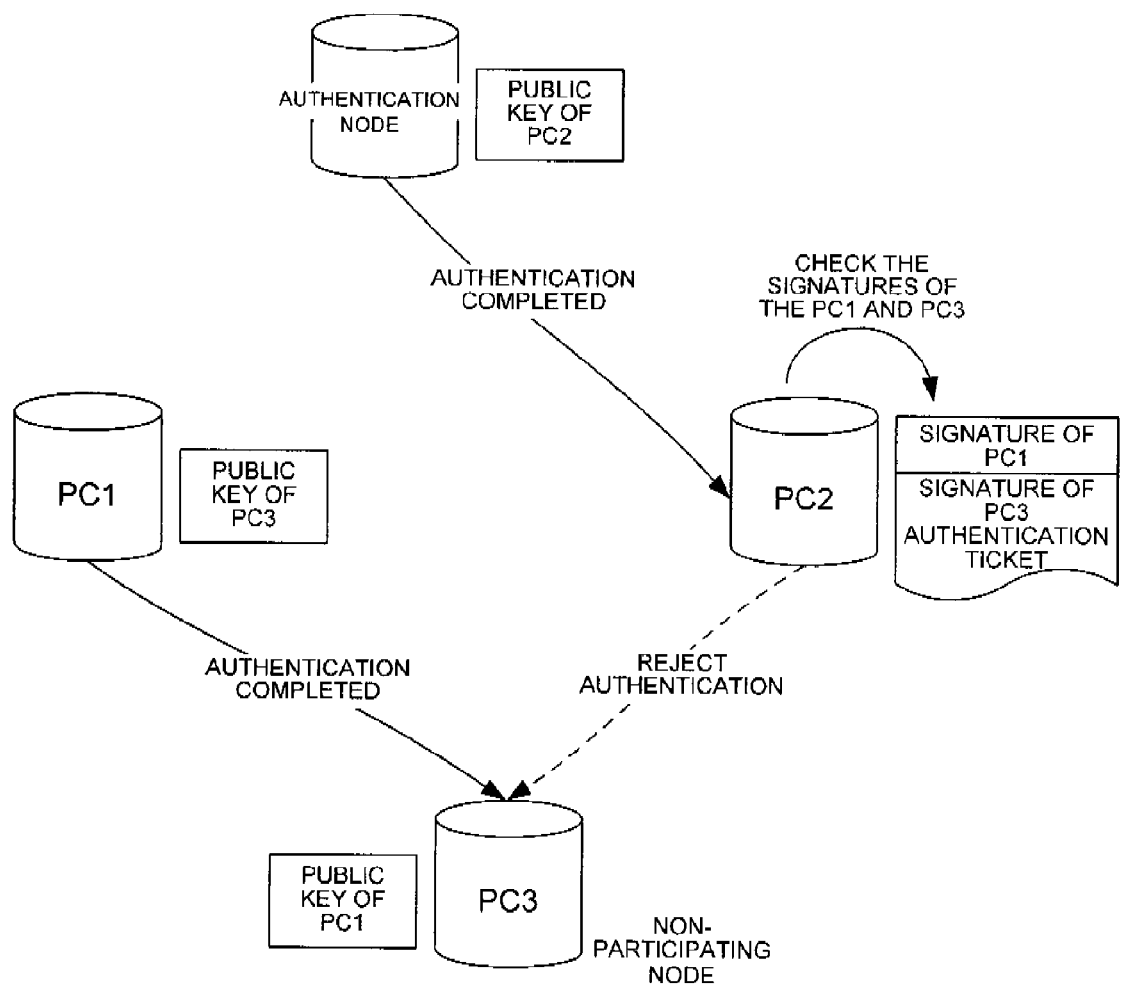
FIG. 20 is a drawing illustrating an example in which the authentication ends up failing with respect to an application for participation by using the authentication ticket.

FIG. 20 illustrates an example of the incomplete authentication to the application for participation in which the authentication ticket was used.

As an example of the flow of the second participation applying step of FIG. 14, FIG. 20 illustrates the situation where the node (PC3), which does not participate in the workgroup of the node (PC1) and the node (PC2), applies for the participation in the workgroup by accessing the second node (PC2) and submits the authentication ticket received from the first node (PC1) in order to participate (login) in the workgroup.

However, this is an example in which the authentication ticket received from the PC1 which is not in the workgroup is invalid for the authentication.

The step before the second participation applying step follows the same flow as FIG. 8, FIG. 10, and FIG. 13, which were mentioned above. However, the different point is that the authentication node does not store the public keys of the PC1 and PC3. That is, the PC1 is regarded as not participating in the workgroup, and the completion of the authentication of the PC1 has not been verified. In addition, the PC1 is regarded as having issued the authentication ticket without inquiring of the authentication node about the authority of the PC3 when the PC3 applied for participation.

However, the PC3 applies for participation to the PC2 by submitting the authentication ticket issued by the PC1.

Although the PC2, when it has received the authentication ticket from the PC3, attempts to verify the signatures of the authentication ticket by using the public keys stored in the PC2, the public keys of the PC1 and PC3 are actually not stored in the PC2. The PC2 then inquires of the authentication node, however, the public keys of the PC1 and PC3 are not stored in the authentication node either. Hence, the PC2 cannot verify the signatures of the PC1 and PC3, and the authentication results in failure.

The PC2 cannot permit the PC3 to participate and eventually returns an error message to the PC3 or returns an invalid authentication ticket to the PC3. In addition, although the PC2 cannot authenticate only one of the PC1 or PC3, the authentication also results in failure. Note that, in the above description, each of the PC1, PC2 and PC3 is assumed to perform each function of its own roll for the sake of easy understanding. However, each node (terminal device) is configured to perform the function of any of the PC1, PC2 and PC3 because each node is thought to need to play any roll of the PC1, PC2 and PC3.

<An Invalidation of an Authentication Ticket>

The case described above is the case where the authentication ticket is already invalid in the issuing process. However, even if the authentication ticket was issued as a valid authentication ticket, it is desirable, for the sake of security, that the issued authentication ticket is to be invalidated in a certain period of time, and another issuing process of the authentication ticket is to be executed.

The length of the time period to invalidate the authentication ticket can be suitably set from the following conditions:
1. Lapse of a fixed period of time;
2. A certain count of transmission execution;
3. After communication function is interrupted.

As a method of invalidating the authentication ticket, the following process may be employed for example. The issuing time or the transmission history is recorded on the authentication ticket. Then, if the content of the record on the authentication ticket meets the above-mentioned conditions when the authentication ticket is received by the node in the workgroup, the node does not authenticate and sends back the message that tells the authentication ticket has got invalidated.

When the non-participating node receives the message which tells that the authentication ticket is invalidated, the non-participating node can perform an application for participation again according to an above-mentioned flow.

As mentioned above, according to the authentication method, the authentication system and the terminal device related to the embodiment, any of the nodes which are already participating in the workgroup authenticates the node which attempts to participate in the workgroup, and the authentication ticket having the signatures of both participating and non-participating nodes is issued. When the authentication ticket is submitted to any other nodes in the workgroup, the node which has received the authentication ticket permits the access of the concerned node by authenticating the nodes which have signed the authentication ticket without performing the password-based-authentication.

Thereby, in the network system of distributed processing, the authentication of a non-participating node which attempts to access each of the nodes constituting the workgroup can be simplified by using the authentication ticket. Further, authentication can be realized even in the case of multicast by transmitting the authentication tickets to a plurality of nodes enables.

In addition, in the embodiment of the present invention, instead of the password-based-authentication which generally needs multiple transmission and reception, even an application for participation by multicast can be authenticated. In the case of the application for participation, the node which is to apply for participation multicast-transmits the authentication tickets to a plurality of the nodes in the workgroup, and the nodes which receive the authentication ticket authenticate the applicant node.

In addition, the present invention is not limited to the above-mentioned embodiments. Various changes and modifications are also included in the scope of the present invention without departing from the scope and spirit of the present invention.

What is claimed is:

1. An authentication method for authenticating a third node which applies to participate in a workgroup comprised of a first node and a second node which are in a network system, the authentication method comprising the steps of:
   transmitting a temporary authentication ticket including a digital signature of the third node from the third node to the first node;
   authenticating the third node by the first node based on the digital signature of the temporary authentication ticket received from the third node;
   transmitting a password for participating in the workgroup from the third node to the first node;
   verifying by the first node the password received from the third node;
   generating a regular authentication ticket by the first node by adding a digital signature of the first node to the temporary authentication ticket to transmit the regular authentication ticket to the third node in a case where the third node has been successfully authenticated based on the digital signature, and the password is correct;
   transmitting from the third node to the second node the regular authentication ticket received from the first node;
   authenticating the first node and the third node by the second node based on the digital signatures of the regular authentication ticket received from the third node; and
   causing the second node to permit the third node to access, as a node of the workgroup, the second node in a case where the first node and the third node have been successfully authenticated.

2. The authentication method of claim 1, wherein the temporary authentication ticket includes information about the workgroup.

3. The authentication method of claim 1, wherein information of the digital signature of the third node includes identification information unique to the third node.

4. The authentication method of claim 1, wherein the first node inquires of an authentication node about information of the digital signature of the third node when the first node authenticates the third node based on the digital signature of the temporary authentication ticket.

5. The authentication method of claim 1, wherein the second node inquires of an authentication node about information of the digital signatures of the first node and the third node when the second node authenticates the first node and the third node based on the digital signatures of the regular authentication ticket.

6. The authentication method of claim 1, wherein the regular authentication ticket is invalidated in a certain time period, and the second node does not permit the third node to access, as a node of the workgroup, the second node when the second node has received the invalidated regular authentication ticket from the third node.

7. An authentication system for authenticating a third node which applies to participate in a workgroup comprised of a first node and a second node which are in a network system, the authentication system comprising:
   the first node; the first node including:
      a first authentication section which is adapted to authenticate the third node based on a digital signature of a temporary authentication ticket received from the third node;
      a password verification section which is adapted to verify a password received from the third node;
      a first authentication ticket generating section which is adapted to add a digital signature of the first node to the temporary authentication ticket to generate a regular authentication ticket therefrom when the first authentication section has successfully authenticated, and the password verification section has successfully verified the password; and
      a first authentication ticket transmitting section which is adapted to transmit to the third node the regular authentication ticket generated by the first authentication ticket generating section, the second node; the second node including:
- a second authentication section which is adapted to authenticate the first node and the third node based on digital signatures of the regular authentication ticket received from the third node; and
- a permission section which is adapted to permit the third node to access, as a node of the workgroup, the second node when the second node has successfully authenticated the first node and the third node, and the third node; the third node including:
- a second authentication ticket generating section which is adapted to generate the temporary ticket including the digital signature of the third node;
- a second authentication ticket transmitting section which is adapted to transmit to the first node the temporary authentication ticket generated by the second authentication ticket generating section;
- a password transmission section which is adapted to transmit to the first node the password for participating in the workgroup;
- a storage section which is adapted to store the regular authentication ticket received from the first node; and
- a third authentication ticket transmitting section which is adapted to transmit the regular authentication ticket to the second node when the third node applies to access the second node.

8. The authentication system of claim 7, wherein the temporary authentication ticket includes information about the workgroup.

9. The authentication system of claim 7, wherein information of the digital signature of the third node includes identification information unique to the third node.

10. The authentication system of claim 7, comprising:
- an authentication node of which the first authentication section of the first node inquires about information of the digital signature of the third node when the first authentication section of the first node authenticates the third node based on the digital signature of the temporary authentication ticket.

11. The authentication system of claim 7, comprising:
- an authentication node of which the second authentication section of the second node inquires about information of the digital signatures of the first node and the third node when the second authentication section authenticates the first node and the third node based on the digital signatures of the regular authentication ticket.

12. The authentication system of claim 7, wherein the regular authentication ticket is invalidated in a certain time period, and the second node does not permit the third node to access, as a node of the workgroup, the second node when the second node has received the invalidated regular authentication ticket from the third node.

13. A terminal device which functions as a node for constituting a workgroup on a network, the terminal device comprising:
- a second authentication ticket generating section which is adapted to generate a temporary authentication ticket including a digital signature of the terminal device when the terminal device is not in the workgroup;
- a second authentication ticket transmitting section which is adapted to transmit the temporary authentication ticket generated by the second authentication ticket generating section to a first node constituting the workgroup;
- a password transmission section which is adapted to transmit to the first node a password for participating in the workgroup;
- a storage section which is adapted to receive and store a regular authentication ticket which has been generated in the first node after the terminal device was authenticated by the first node;
- a second authentication ticket transmitting section which is adapted to transmit the regular authentication ticket stored in the storage section to a second node when the terminal device accesses the second node;
- a first authentication section which is adapted to authenticate a third node based on a digital signature of a temporary authentication ticket received, when the terminal device is in the workgroup, from the third node;
- a password verification section which is adapted to verify a password received from the third node;
- a first authentication ticket generating section which is adapted to add the digital signature of the terminal device to the temporary authentication ticket received from the third node to generate a regular authentication ticket when the first authentication section has successfully authenticated the third node, and the password verification section has successfully verified the password received from the third node;
- a first authentication ticket transmitting section which is adapted to transmit to the third node the regular authentication ticket generated by the first authentication ticket generating section;
- a second authentication section which is adapted to authenticate a forth node and a fifth node based on digital signatures of a regular authentication ticket received, when the terminal device is in the workgroup, from the fourth node, the received regular authentication ticket including a digital signature of the fifth node,
- a permission section which is adapted to permit the fourth node to access, as a node of the workgroup, the terminal device when the second authentication section has successfully authenticated the fourth node and the fifth node.

* * * * *